(12) United States Patent
Sasaki et al.

(10) Patent No.: US 8,499,435 B2
(45) Date of Patent: Aug. 6, 2013

(54) METHOD OF MANUFACTURING A THIN-FILM MAGNETIC HEAD

(75) Inventors: Yoshitaka Sasaki, Milpitas, CA (US);
Hiroyuki Ito, Milpitas, CA (US);
Shigeki Tanemura, Milpitas, CA (US);
Kazuki Sato, Milpitas, CA (US);
Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/279,978

(22) Filed: Oct. 24, 2011

(65) Prior Publication Data
US 2013/0100555 A1   Apr. 25, 2013

(51) Int. Cl.
*G11B 5/127*   (2006.01)
*H04R 31/00*   (2006.01)

(52) U.S. Cl.
USPC .............. 29/603.14; 29/603.13; 29/603.15; 29/603.16; 29/603.18; 216/22; 216/39; 216/41; 216/48; 216/65; 360/121; 360/122; 360/317; 427/127; 427/128

(58) Field of Classification Search
USPC ............ 29/603.11, 603.13–603.16, 603.18; 216/22, 39, 41, 48, 65; 360/121, 122, 317; 451/5, 41
See application file for complete search history.

(56) References Cited

U.S. PATENT DOCUMENTS

| 8,077,433 B2 * | 12/2011 | Sasaki et al. | 360/123.15 |
| 8,345,382 B1 * | 1/2013 | Sasaki et al. | 360/123.06 |
| 2005/0128637 A1 * | 6/2005 | Johnston et al. | 360/125 |

FOREIGN PATENT DOCUMENTS

| JP | A-2008-097826 | 4/2008 |
| JP | A-2010-157303 | 7/2010 |

* cited by examiner

*Primary Examiner* — Paul D Kim
(74) *Attorney, Agent, or Firm* — Oliff & Berridge, PLC

(57) ABSTRACT

A thin-film magnetic head is constructed such that a main magnetic pole layer, a lower shield layer, an upper shield layer and a thin-film coil are laminated on a substrate. A method of manufacturing the thin-film magnetic head has a lower shield layer forming step. This step comprises a step of forming a first lower shield part in a lower shield planned area, including a planned line along the medium-opposing surface, a step of forming a partial lower seed layer having a partial arrangement structure in which the partial lower seed layer is arranged on a lower formation zone except a lower exception zone including the planned line, a step of forming a second lower shield part on the partial lower seed layer.

10 Claims, 41 Drawing Sheets

Fig.21
(a)
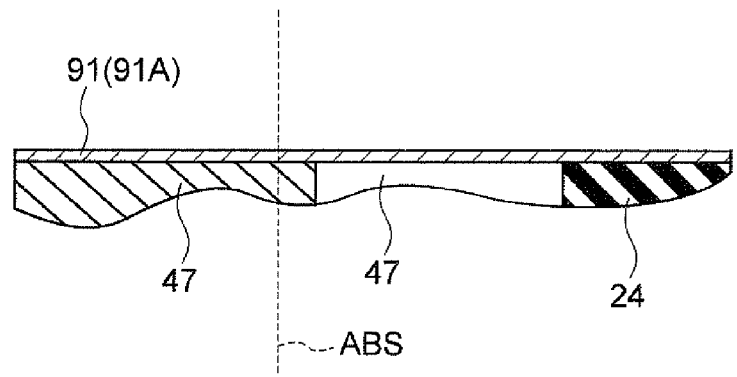
(b)
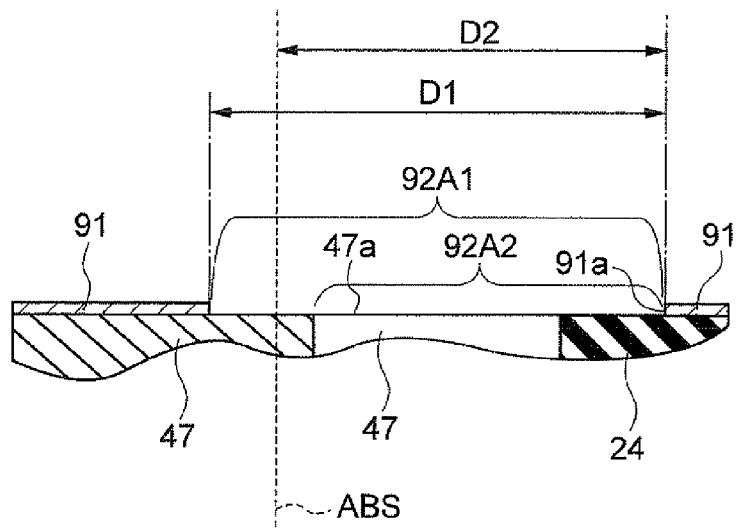

Fig.22
(a)
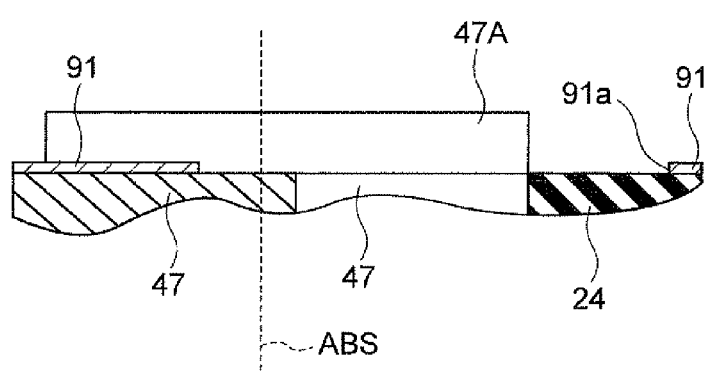
(b)
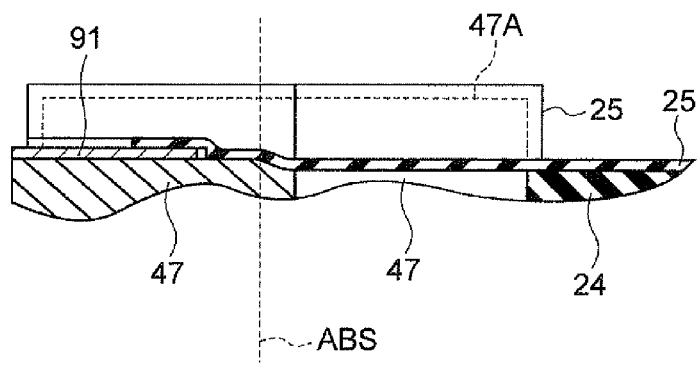

Fig.23
(a)
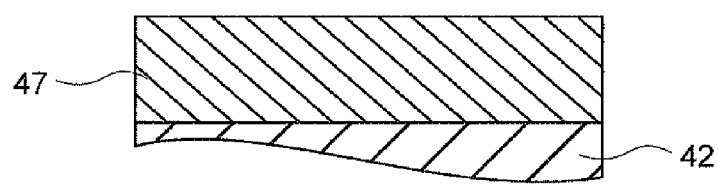
(b)
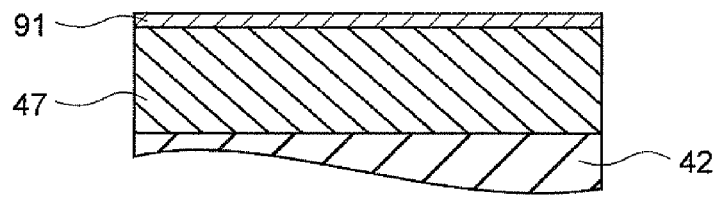

Fig.25
(a)
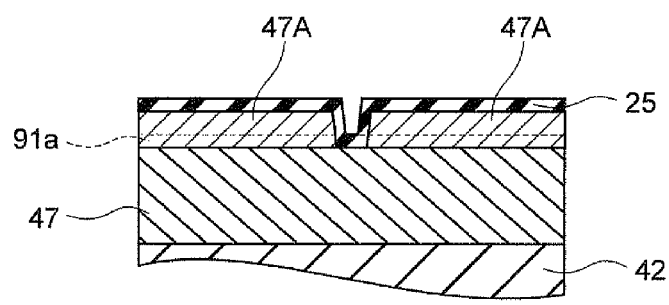
(b)
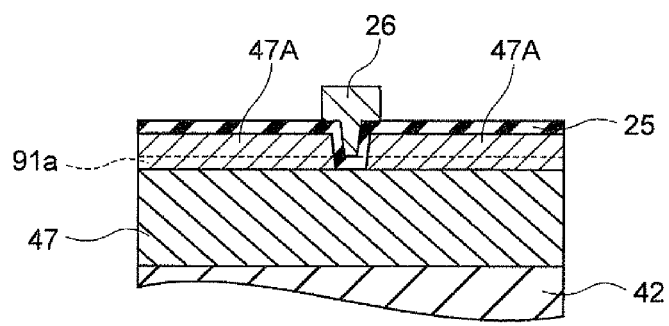

METHOD OF MANUFACTURING A THIN-FILM MAGNETIC HEAD

BACKGROUND

1. Field of the Invention

The present invention relates to a method of manufacturing the thin-film magnetic head which performs a magnetic recording action by a perpendicular magnetic recording scheme, the thin-film magnetic head, a head gimbal assembly, and a hard disk drive.

2. Related Background Art

A hard disk drive has a large recording capacity and is used as the heart of a storage device. The hard disk drive records and reproduces data to/from a hard disk (recording medium) by a thin-film magnetic head.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Meanwhile, a conventional magnetic head of perpendicular magnetic recording type (perpendicular magnetic recording head which will also be referred to as "PMR" in the following) has a magnetic pole layer and a thin-film coil. The PMR has a structure of electromagnet which the thin-film coil are wound around the magnetic pole layer.

For example, a conventional PMR has a main magnetic pole layer having a magnetic pole end face on a side of a medium-opposing surface opposing a recording medium, a thin-film coil which generates a magnetic field passes through the inside of the main magnetic pole layer, and a return magnetic pole layer linked to the main magnetic pole layer through a linking part.

Meanwhile, a PMR that a shield layer is formed near the main magnetic pole layer is known. For example, in JP 2010-157303 (referred to also as Patent Document 1), the PMR that the shield layer is formed on a leading side of the main magnetic pole layer is disclosed. In this PMR, an end face of the shield layer is disposed in the medium-opposing surface together with a magnetic pole end part of the main magnetic pole layer. Besides, in JP 2008-97826 (referred to also as Patent Document 2), the PMR that the shield layer is formed on a trailing side of the main magnetic pole layer is disclosed. In this PMR, the end face of the shield layer is disposed in the medium-opposing surface together with a magnetic pole end part of the main magnetic pole layer, too.

SUMMARY OF THE INVENTION

In the above-described conventional PMR, a shield layer formed near the main magnetic pole layer can prevent a magnetic flux emitted from the magnetic pole end face from reaching an area different from the recording target area on the recording medium. Therefore, in the above-described conventional PMR, failure such as recording of error data on the area different from the recording target area or erasure of recorded data can be reduced.

However, in the above-described conventional PMR, the shield layer has a structure in which a plurality of shield parts are stacked (such a shield layer is referred also to as a multiple shield layer) and the shield layer is formed near the main magnetic pole layer in the medium-opposing surface, and therefore the following problems are not solved yet.

Specifically, when forming the multiple shield layer, for example, a first shield part is formed by plating method, and then a second shield part is formed by plating method to overlie the first shield part. Further, when forming the second shield part, a seed layer being a ground of the second shield part is formed on the first shield part and a plating film is grown on the seed layer to form the second shield part.

When forming the first shield part and the second shield part, electro plating is mainly employed. In this case, the substrate is immersed in a plating solution and electric current is passed through the plating solution to cause a plating film made of a magnetic material to grow on the substrate, and the plating film is used to form the first shield part and the second shield part.

In contrast to the above, the seed layer is formed by sputtering or the like under a dry environment without using solution. Therefore, the first shield part and the second shield part are formed using the same magnetic material as but different in the direction of crystal from the seed layer.

Generally, the magnetic characteristics of the magnetic material are different according to the direction of crystal, and the direction through which the magnetic flux easily transmits is different depending on the direction of crystal. Therefore, if a seed layer different in magnetic characteristics from the first shield part and the second shield part exists between them in the medium-opposing surface, components of the magnetic flux emitted from the magnetic pole end face become difficult to be absorbed.

More specifically, after the magnetic flux according to the recording magnetic field is emitted from the magnetic pole end face, components of the magnetic flux spreading in the track width direction and the like are not absorbed by the first shield part or the second shield part but likely to remain. Then, the remaining magnetic flux tends to cause a phenomenon that data recorded on a track adjacent to a track on which data is to be recorded or a track located at a position distanced by about several μm to several tens μm from the track on which data is to be recorded is erased (these phenomena are referred also to as adjacent track erasure (ATE) and wide area track erasure (WATE)).

The present invention is made to solve the above problem, and it is an object to improve ATE and WATE caused by a multiple shield layer in a method of manufacturing a thin-film magnetic head which performs a magnetic recording action by a perpendicular magnetic recording scheme, the thin-film magnetic head, a head gimbal assembly, and a hard disk drive.

To solve the above problem, the present invention is a method of manufacturing a thin-film magnetic head constructed such that a main magnetic pole layer having a magnetic pole end face on a side of a medium-opposing surface opposing a recording medium, a lower shield layer and an upper shield layer having respective shield end faces arranged in the medium-opposing surface and arranged to hold the main magnetic pole layer therebetween, and a thin-film coil wound around any one of the main magnetic pole layer, the lower shield layer, and the upper shield layer are laminated on a substrate, a lower shield layer forming step of forming the lower shield layer including the following steps (1) to (3):

(1) a first lower shield part forming step of forming a first lower shield part constituting the lower shield layer in a lower shield planned area on the substrate, including a planned line along the medium-opposing surface which the medium-opposing surface is formed later;

(2) a lower seed layer forming step of forming a partial lower seed layer having a partial arrangement structure in which the partial lower seed layer is arranged on a lower formation zone except a lower exception zone including the planned line when forming a lower seed layer for forming a second lower shield part constituting the lower shield layer on the first lower shield part; and (3) a second lower shield part forming step of forming the second lower shield part on the partial lower seed layer.

According to the above-described manufacturing method, the partial lower seed layer being the ground when forming the second lower shield part has the partial arrangement structure, so that the partial lower seed layer is not arranged on the planned line. Therefore, by forming the medium-opposing surface along the planned line, the partial lower seed layer can be made not to appear in the medium-opposing surface.

In the above-described method of manufacturing the thin-film magnetic head, it is preferable that an upper shield layer forming step of forming the upper shield layer includes the following steps (4) to (5), in the first upper shield part forming step, the first upper shield part is formed on the partial upper seed layer.

(4) an upper seed layer forming step of forming a partial upper seed layer having a partial arrangement structure in which the partial upper seed layer is arranged on an upper formation zone except an upper exception zone including the planned line when forming an upper seed layer for forming a first upper shield part constituting the upper shield layer on the main magnetic pole layer (5) a first upper shield part forming step of forming the first upper shield part.

According to the above-described manufacturing method, the partial upper seed layer being the ground when forming the first upper shield part has the partial arrangement structure, so that the partial upper seed layer is also not arranged on the planned line. Therefore, the partial upper seed layer can be made not to appear in the medium-opposing surface.

In the above-described method of manufacturing the thin-film magnetic head, it is preferable that the lower seed layer forming step includes the following steps (6) to (7).

(6) a wide lower seed layer forming step of forming a wide lower seed layer arranged on the lower exception zone and the lower formation zone on an upper face of a multilayer body including the substrate when forming the partial lower seed layer (7) a lower seed layer removing step of removing an excepted lower seed layer formed on the lower exception zone of the wide lower seed layer.

According to the above-described manufacturing method, the wide lower seed layer is formed on the upper face of the multilayer body and then the excepted lower seed layer is removed, whereby the partial lower seed layer is formed.

Further, in the above-described method of manufacturing the thin-film magnetic head, it is preferable that the upper seed layer forming step includes the following steps (8) to (9).

(8) a wide upper seed layer forming step of forming a wide upper seed layer arranged on the upper exception zone and the upper formation zone on an upper face of a multilayer body including the substrate when forming the partial upper seed layer.

(9) an upper seed layer removing step of removing an excepted upper seed layer, of the wide upper seed layer, formed on the upper exception zone.

According to the above-described manufacturing method, the wide upper seed layer is formed on the upper face of the multilayer body and then the excepted upper seed layer is removed, whereby the partial upper seed layer is formed.

Further, in the above-described method of manufacturing the thin-film magnetic head, it is preferable that in the lower seed layer forming step, the lower exception zone is set in a band-shaped area along the medium-opposing surface including the whole planned line.

According to this manufacturing method, since the partial lower seed layer is not arranged on any part on the planned line, the partial lower seed layer can be made not to appear at all in the medium-opposing surface.

Further, in the above-described method of manufacturing the thin-film magnetic head, it is preferable that in the upper seed layer forming step, the upper exception zone is set in a band-shaped area along the medium-opposing surface including the whole planned line.

According to this manufacturing method, since the partial upper seed layer is not arranged on any part on the planned line, the partial upper seed layer can be made not to appear at all in the medium-opposing surface.

Further, in the above-described method of manufacturing the thin-film magnetic head, it is preferable that assuming that a direction separating from the medium-opposing surface toward a position where the thin-film coil is formed on the substrate is a depth direction, the lower exception zone is secured along the depth direction from outside the planned line, in the lower seed layer forming step.

Further, in the above-described method of manufacturing the thin-film magnetic head, it is preferable that assuming that a direction separating from the medium-opposing surface toward a position where the thin-film coil is formed on the substrate is a depth direction, the upper exception zone is secured along the depth direction from outside the planned line, in the upper seed layer forming step.

Further, in the above-described method of manufacturing the thin-film magnetic head, it is preferable that an upper shield layer forming step of forming the upper shield layer, includes the following steps (10) to (13).

(10) a first upper shield part forming step of forming a first upper shield part constituting the upper shield layer

(11) a second upper shield part forming step of forming a second upper shield part constituting the upper shield layer on the medium-opposing surface side of a conductor layer constituting the thin-film coil such that the second upper shield part is connected to the first upper shield part and arranged in the medium-opposing surface

(12) a linking shield part forming step of forming a linking shield part constituting the upper shield layer such that the linking shield part is connected to the second upper shield part, straddles the thin-film coil, and recesses from the medium-opposing surface to be distanced from the medium-opposing surface

(13) a trimming step of cutting off a part of the second upper shield part on the medium-opposing surface side that is not covered with the linking shield part.

In case of the above-described method of manufacturing, it is preferable that in the trimming step, the part of the second upper shield part, on the medium-opposing surface side, which is not covered with the linking shield part is cut off using the linking shield part formed by the linking shield part forming step as a mask.

Further, the present invention provides a thin-film magnetic head constructed such that a main magnetic pole layer having a magnetic pole end face on a side of a medium-opposing surface opposing a recording medium, a lower shield layer and an upper shield layer having respective shield end faces arranged in the medium-opposing surface and arranged to hold the main magnetic pole layer therebetween, and a thin-film coil wound around any one of the main magnetic pole layer, the lower shield layer, and the upper shield layer are laminated on a substrate, the thin-film magnetic head including: a first lower shield part constituting the lower shield layer, a second lower shield part constituting the lower shield layer and formed on the first lower shield part; and a lower seed layer for forming the second lower shield part by plating, the lower seed layer is formed as a partial lower seed layer having a partial arrangement structure in which the partial lower seed layer is arranged only on a lower formation zone which is receding from the medium-opposing surface.

In case of the above-described a thin-film magnetic head, it is preferable that the thin-film magnetic head further includes a first upper shield part constituting the upper shield layer and formed on the main magnetic pole layer; an upper seed layer arranged between the main magnetic pole layer and the first upper shield part, for forming the first upper shield part by plating, the upper seed layer is formed as a partial upper seed layer having a partial arrangement structure in which the partial upper seed layer is arranged only on an upper formation zone which is receding from the medium-opposing surface.

Further, in case of the above-described a thin-film magnetic head, it is preferable that a lower absence zone where the lower seed layer does not exist is formed between the first lower shield part and the second lower shield part, and an end face of the partial lower seed layer appears in the lower absence zone without appearing in the medium-opposing surface.

It is possible that an upper absence zone where the upper seed layer does not exist is formed between the main magnetic pole layer and the first upper shield part, and an end face of the partial upper seed layer appears in the upper absence zone without appearing in the medium-opposing surface.

Further, in case of the above-described a thin-film magnetic head, it is preferable that the lower absence zone is set in a band-shaped area over an entire width direction of the medium-opposing surface along the medium-opposing surface between the medium-opposing surface and the lower formation zone.

It is possible that the upper absence zone is set in a band-shaped area over an entire width direction of the medium-opposing surface along the medium-opposing surface between the medium-opposing surface and the upper formation zone Further, the present invention provides a head gimbal assembly including a thin-film magnetic head formed on a support and a gimbal for securing the support; the thin-film magnetic head is constructed such that a main magnetic pole layer having a magnetic pole end face on a side of a medium-opposing surface opposing a recording medium, a lower shield layer and an upper shield layer having respective shield end faces arranged in the medium-opposing surface and arranged to hold the main magnetic pole layer therebetween, and a thin-film coil wound around any one of the main magnetic pole layer, the lower shield layer, and the upper shield layer are laminated on a substrate, the thin-film magnetic head including: a first lower shield part constituting the lower shield layer; a second lower shield part constituting the lower shield layer and formed on the first lower shield part; and a lower seed layer for forming the second lower shield part by plating, the lower seed layer is formed as a partial lower seed layer having a partial arrangement structure in which the partial lower seed layer is arranged only on a lower formation zone which is receding from the medium-opposing surface.

Further, the present invention provides a hard disk drive including a head gimbal assembly having a thin-film magnetic head and a recording medium opposing the thin-film magnetic head; the thin-film magnetic head is constructed such that a main magnetic pole layer having a magnetic pole end face on a side of a medium-opposing surface opposing a recording medium, a lower shield layer and an upper shield layer having respective shield end faces arranged in the medium-opposing surface and arranged to hold the main magnetic pole layer therebetween, and a thin-film coil wound around any one of the main magnetic pole layer, the lower shield layer, and the upper shield layer are laminated on a substrate, the thin-film magnetic head including: a first lower shield part constituting the lower shield layer; a second lower shield part constituting the lower shield layer and formed on the first lower shield part; and a lower seed layer for forming the second lower shield part by plating, the lower seed layer is formed as a partial lower seed layer having a partial arrangement structure in which the partial lower seed layer is arranged only on a lower formation zone which is receding from the medium-opposing surface.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 21(a) is a sectional view taken along the line 21a-21a of FIG. 16, FIG. 21(b) is a sectional view taken along the line 21b-21b of FIG. 17;

FIG. 22(a) is a sectional view taken along the line 22a-22a of FIG. 18, FIG. 22(b) is a sectional view taken along the line 22b-22b of FIG. 19;

FIG. 23(a) is a sectional view illustrating a principal part of multilayer body when the multilayer body is cut along a planned line, in the step of manufacturing the thin-film magnetic head 300 according to a first embodiment of the present invention, FIG. 23(b) is a sectional view illustrating a principal part of multilayer body when the multilayer body is cut along a planned line, in a step subsequent to that of FIG. 23(a);

FIG. 25(a) is a sectional view illustrating a principal part of multilayer body when the multilayer body is cut along a planned line, in a step subsequent to that of FIG. 24(b), FIG. 25(b) is a sectional view illustrating a principal part of multilayer body when the multilayer body is cut along a planned line, in a step subsequent to that of FIG. 25(a);

DETAILED DESCRIPTION OF THE EMBODIMENTS

In the following, embodiments of the present invention will be described with reference to the drawings. Note that the same components will be referred to with the same numerals or letters, while omitting their overlapping descriptions.

First Embodiment (Structures of Thin-Film Magnetic Head)

Figure 1:
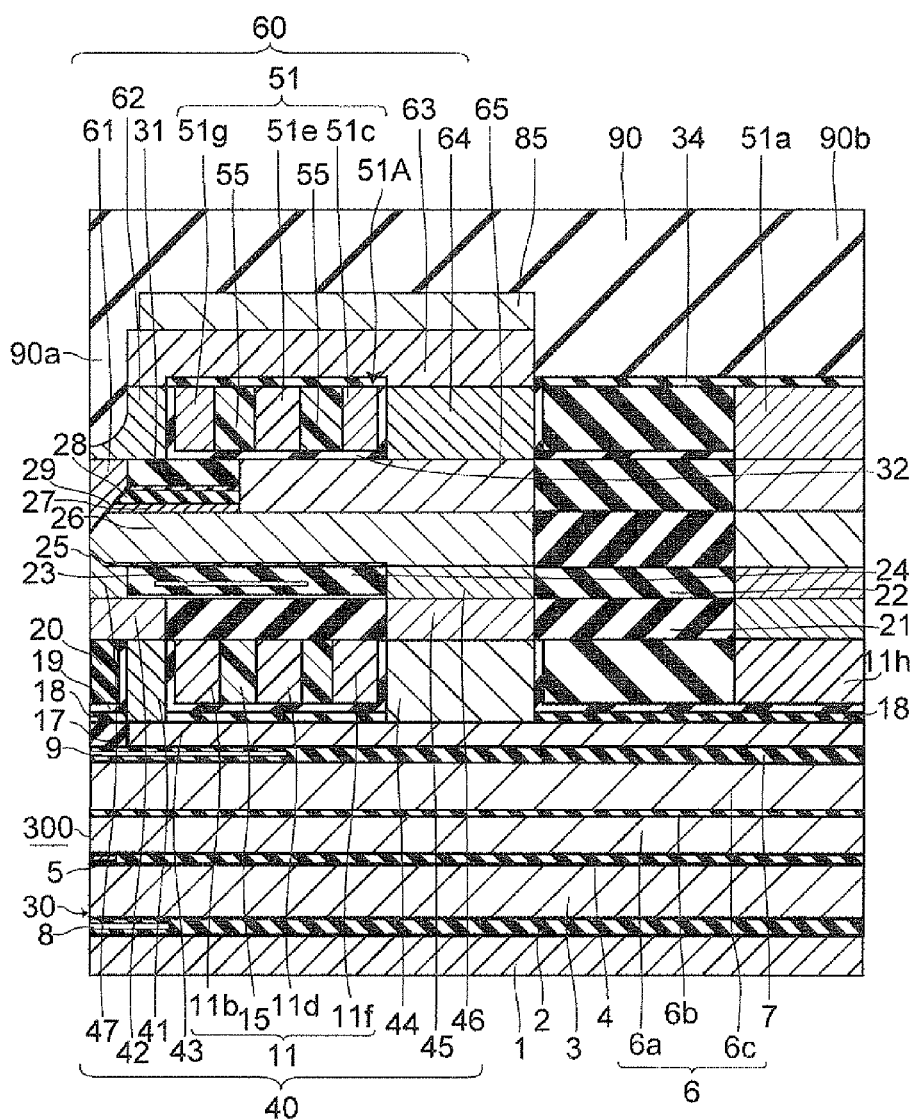
FIG. 1 is a sectional view of the thin-film magnetic head according to a first embodiment of the present invention taken along the line 1-1 of FIG. 2, along by a direction intersecting its air bearing surface.
Figure 2:
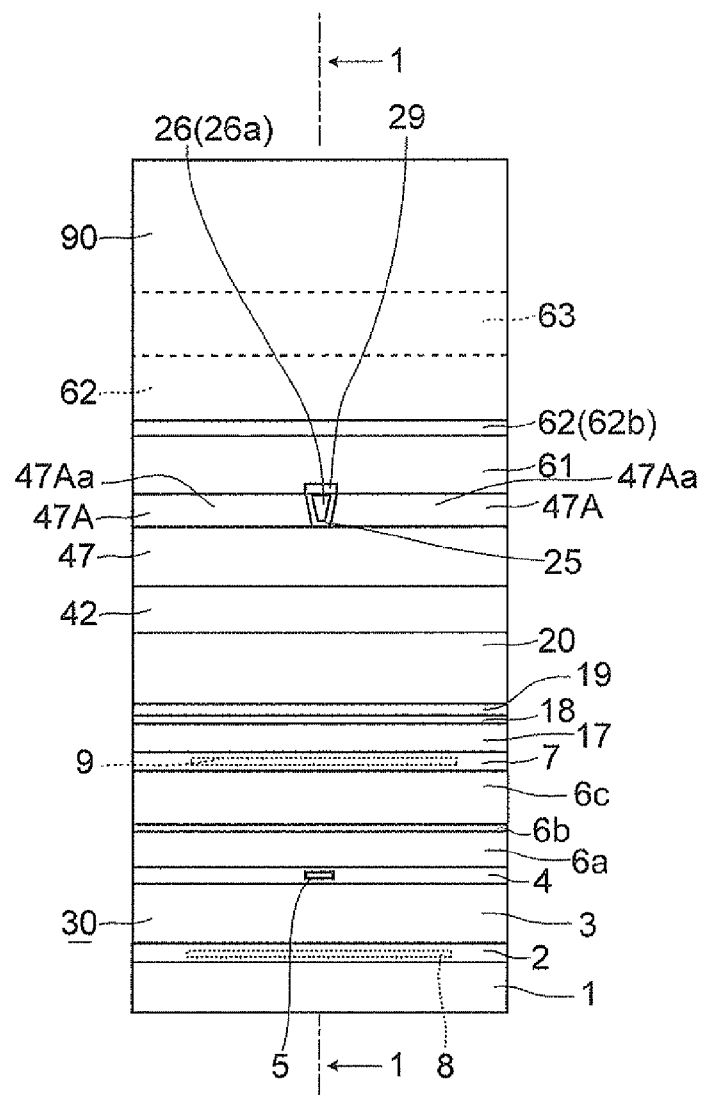
FIG. 2 is a front view illustrating an ABS of the thin-film magnetic head.
Figure 3:
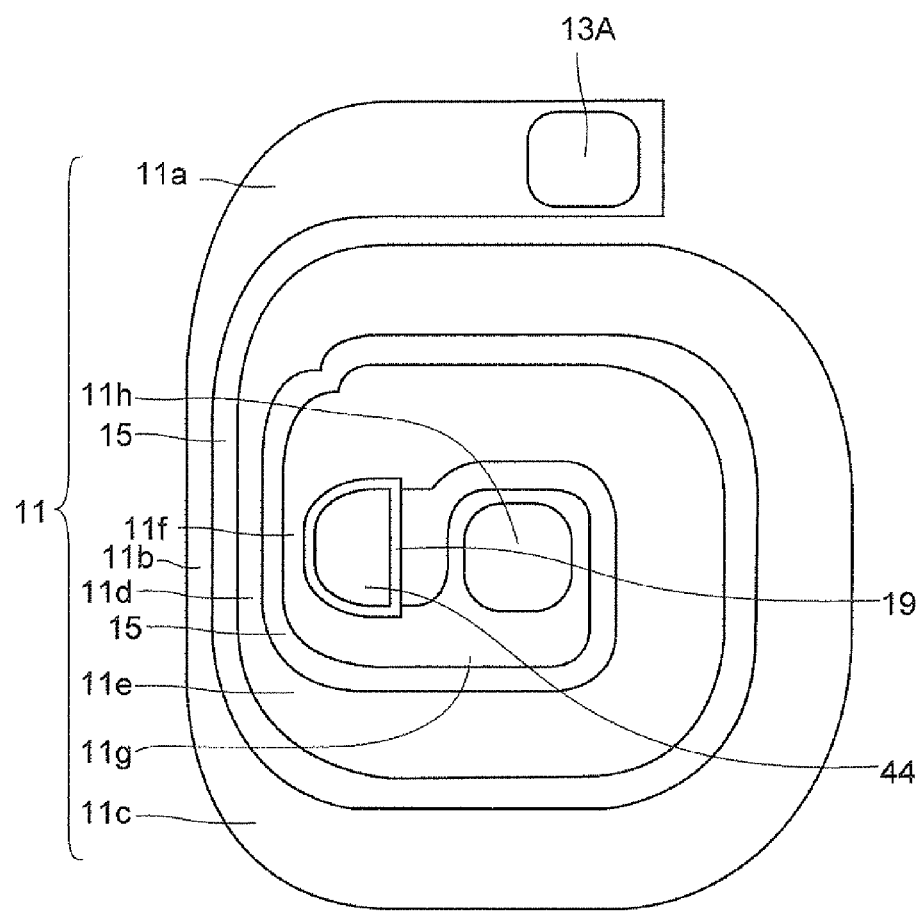
FIG. 3 is a plan view illustrating a lower thin-film coil.
Figure 4:
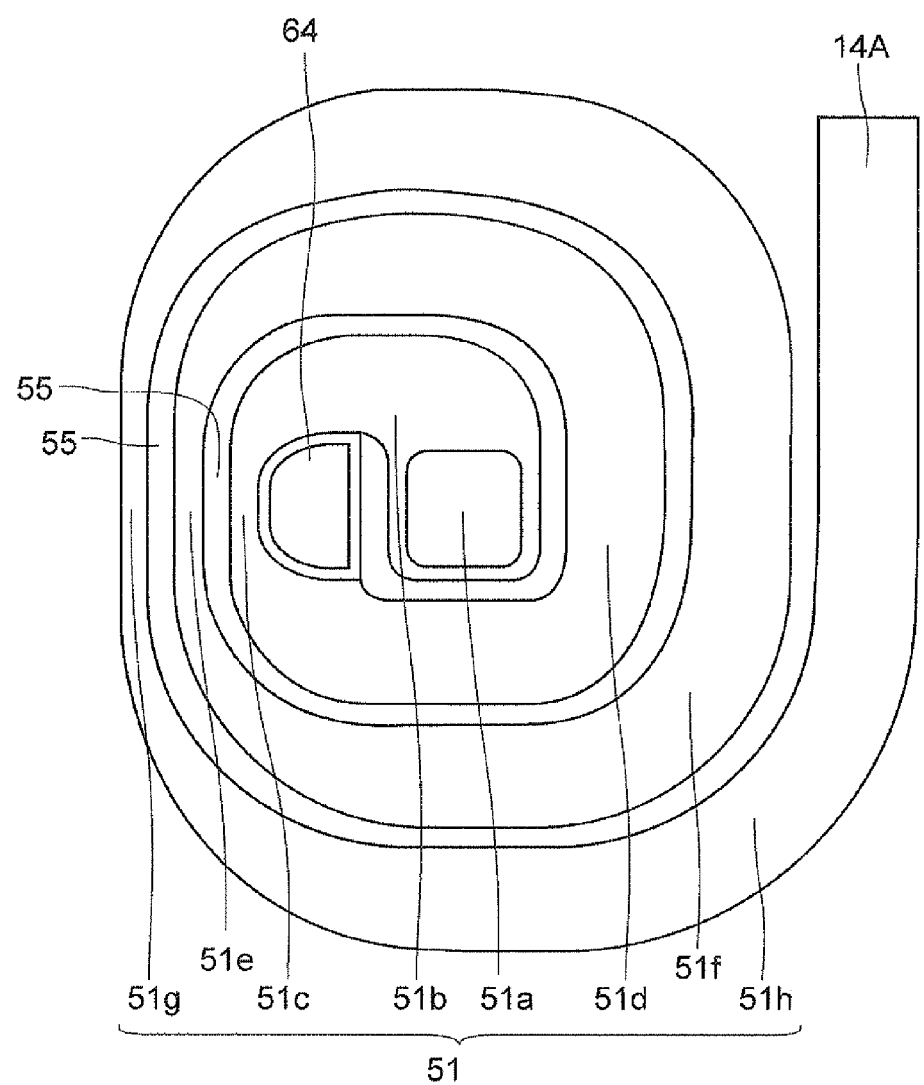
FIG. 4 is a plan view illustrating an upper thin-film coil.
Figure 5:
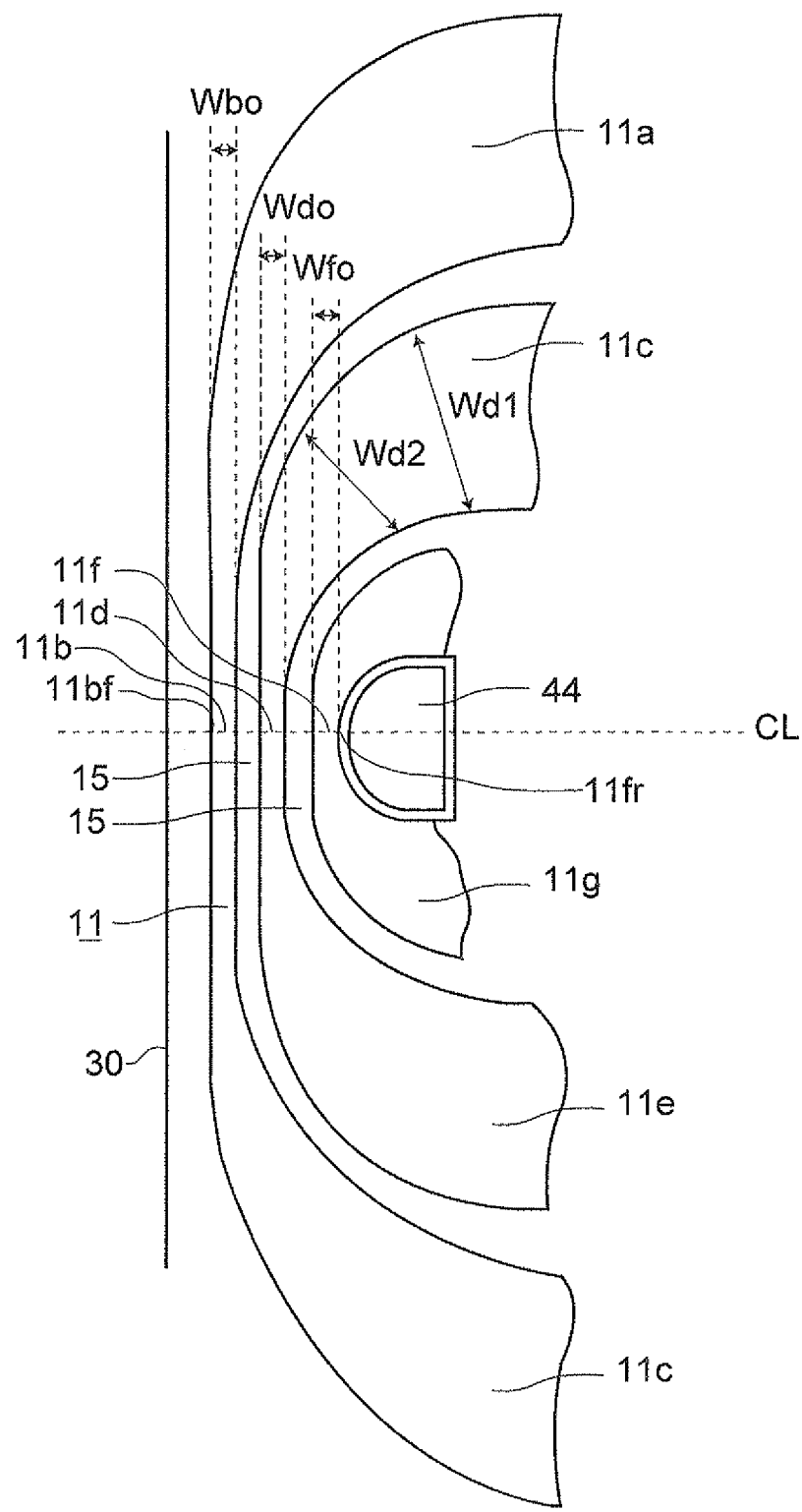
FIG. 5 is a plan view illustrating a principal part of the lower thin-film coil.
Figure 6:
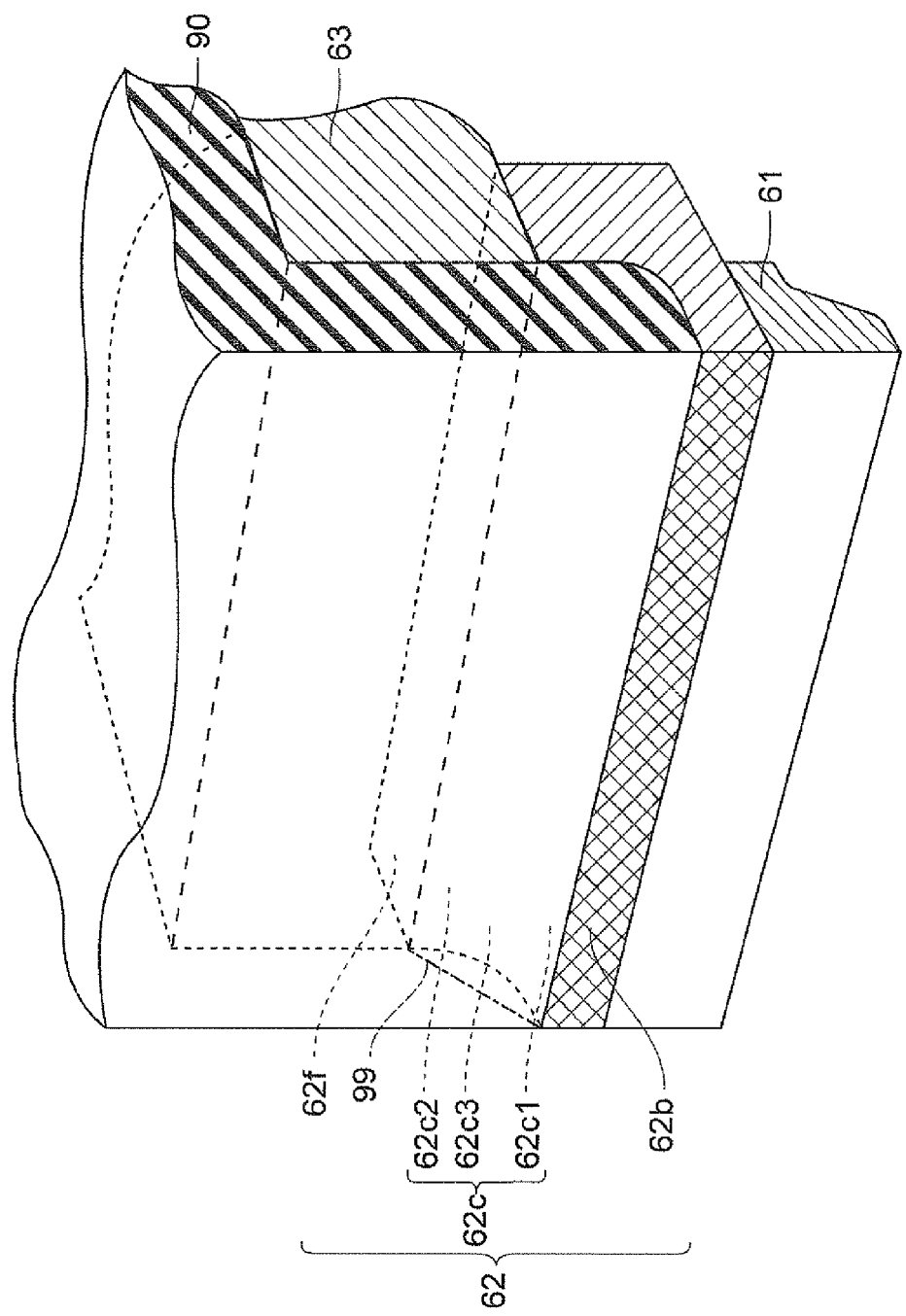
FIG. 6 is a perspective view illustrating principal parts of an opposing shield part, an upper front shield part and a linking shield part.
Figure 7:
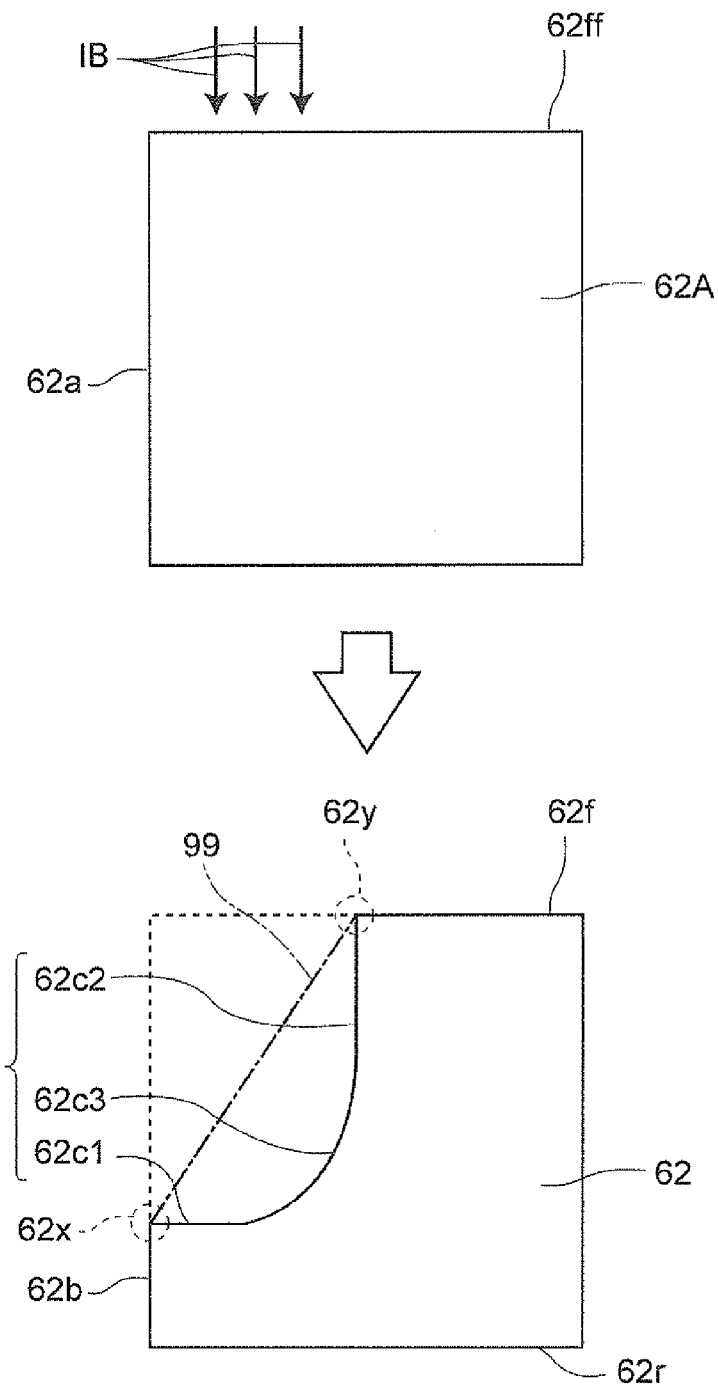
FIG. 7 is a side elevation view illustrating a pre-trim shield part and the upper front shield part.
Figure 8:
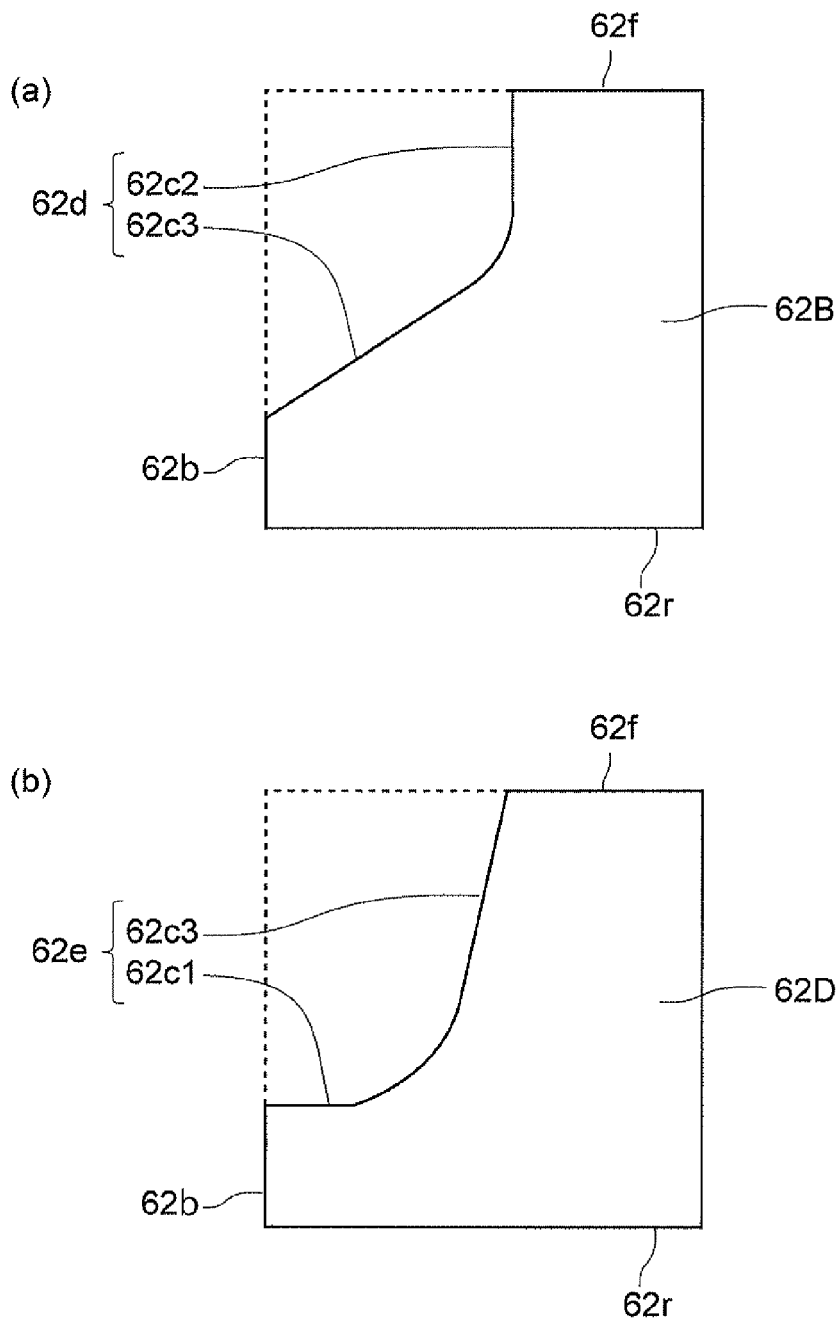
FIG. 8 illustrates a modified example, in which (a) is a side elevation view of the upper front shield part not having a lateral flat part, in which (b) is a side elevation view of the upper front shield part not having a longitudinal flat part.
Figure 9:
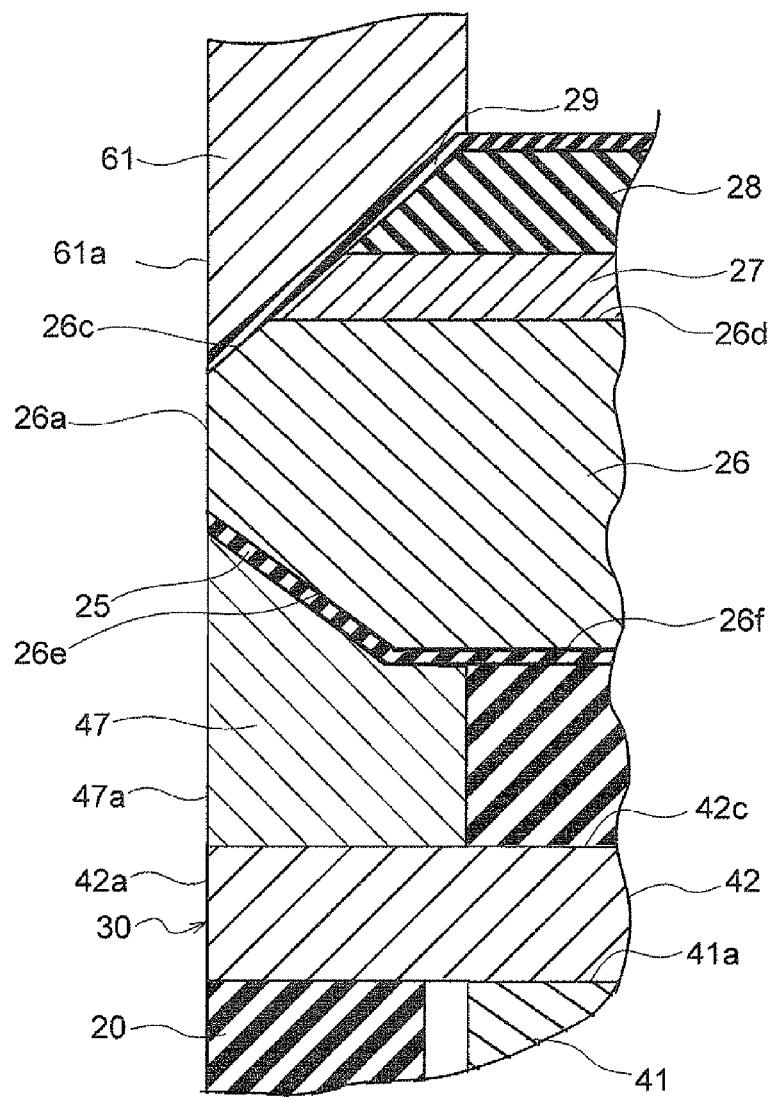
FIG. 9 is a sectional view illustrating a principal part of FIG. 1.
Figure 10:
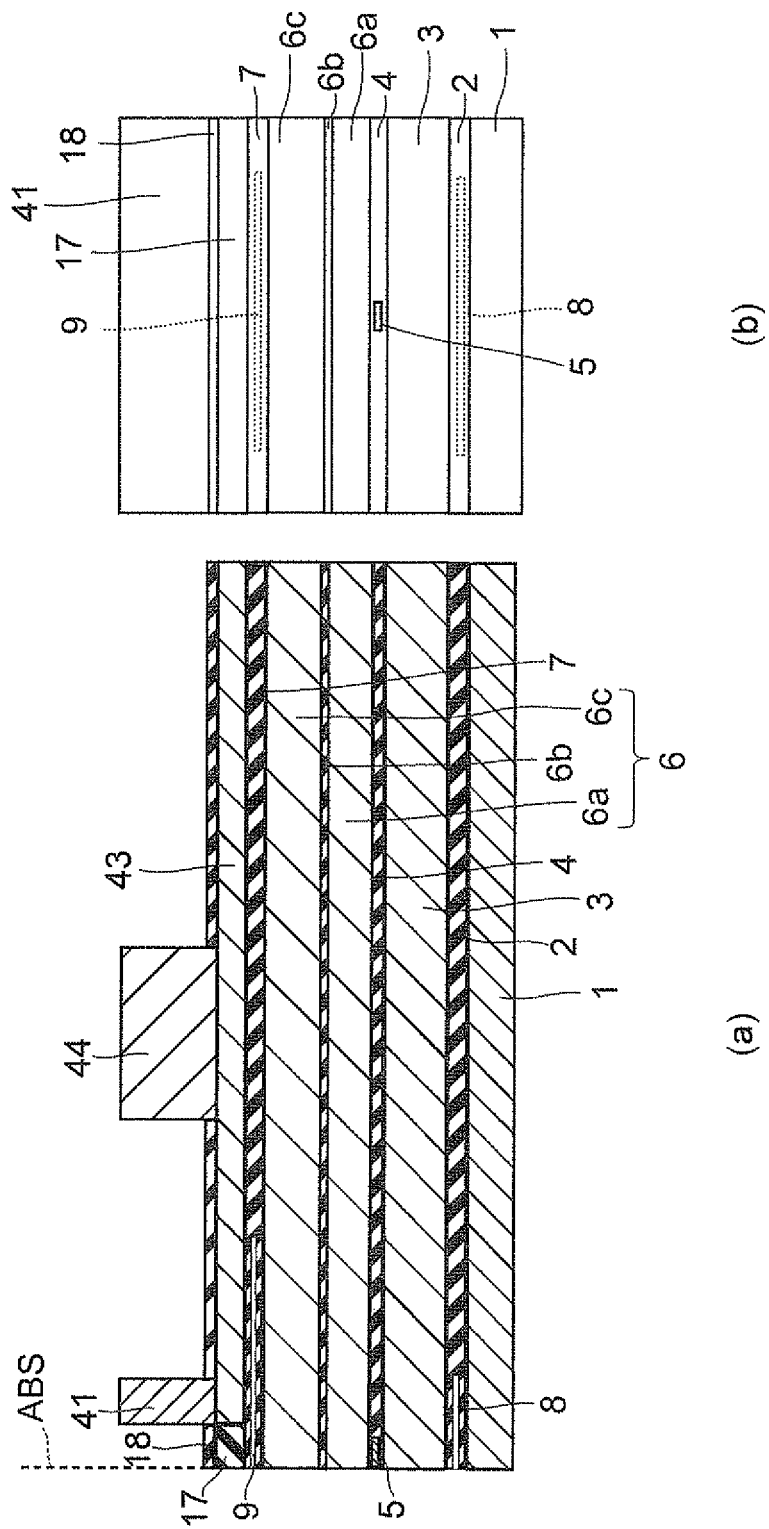
FIG. 10 illustrates a step of manufacturing the thin-film magnetic head illustrated in FIG. 1, in which (a) is a sectional view corresponding to FIG. 1, in which (b) is a front view corresponding to FIG. 2.
Figure 11:
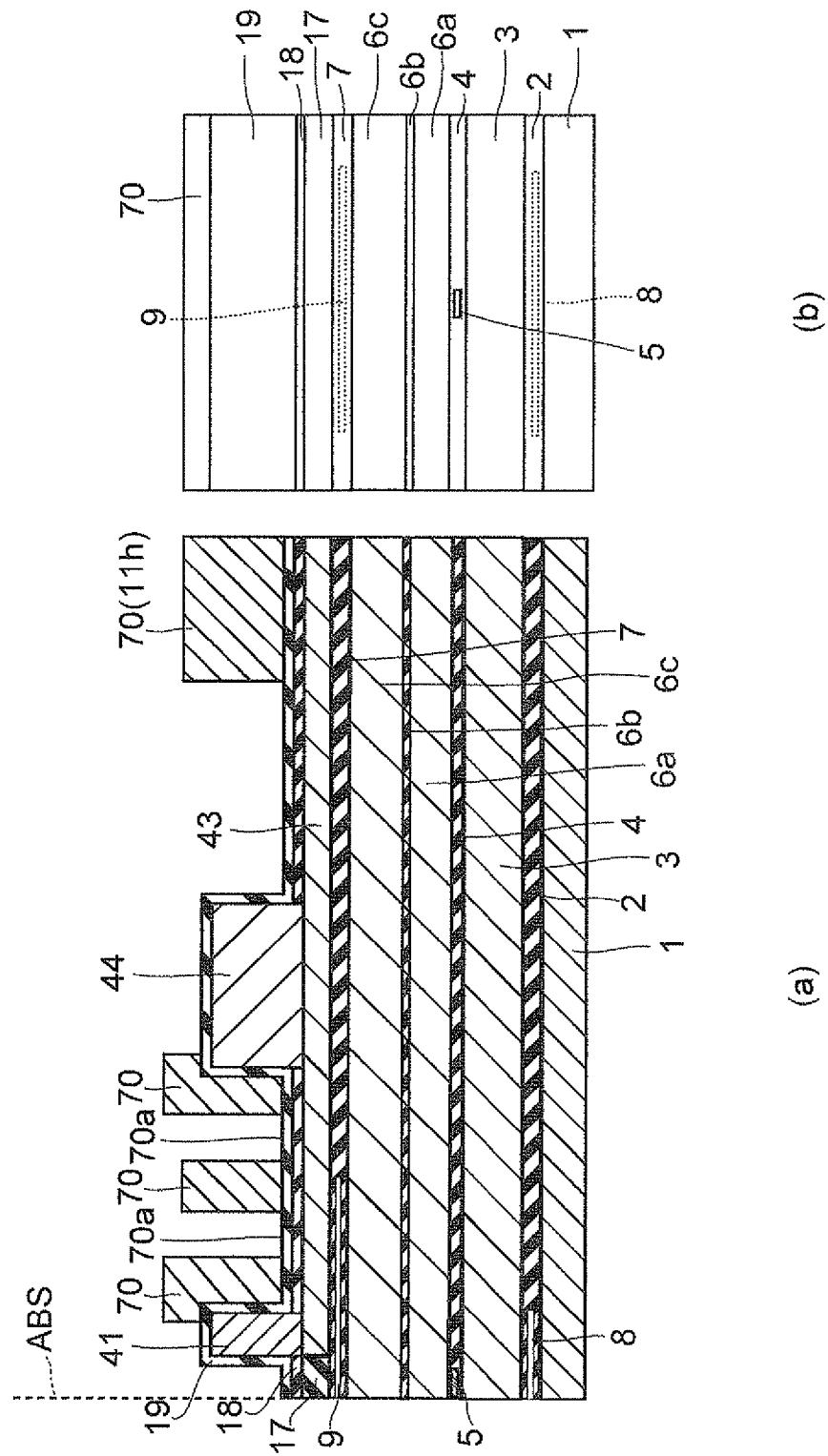
FIG. 11 illustrates a step subsequent to that of FIG. 10, in which (a) is a sectional view corresponding to FIG. 1, in which (b) is a front view corresponding to FIG. 2.
Figure 12:
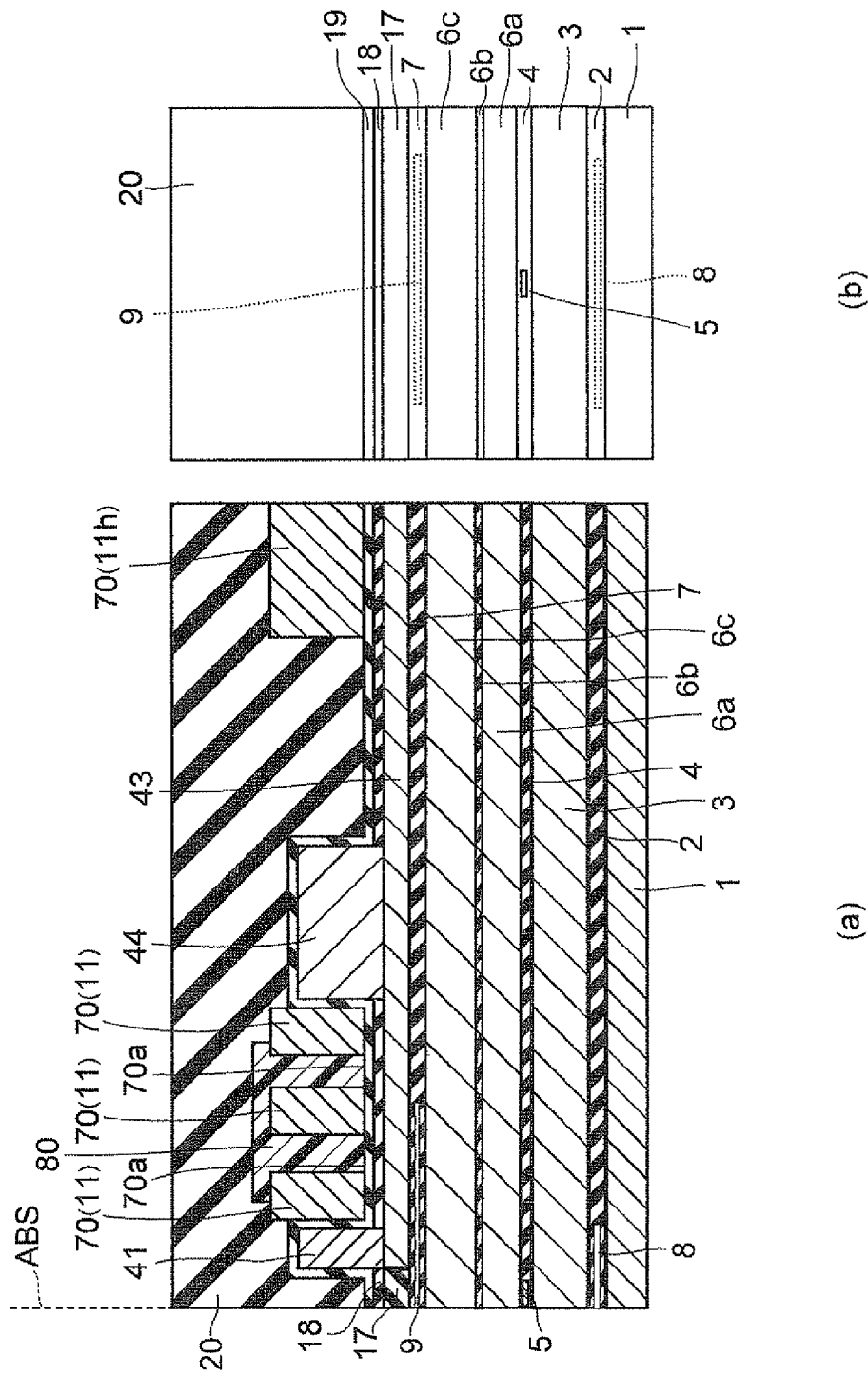
FIG. 12 illustrates a step subsequent to that of FIG. 11, in which (a) is a sectional view corresponding to FIG. 1, in which (b) is a front view corresponding to FIG. 2.
Figure 13:
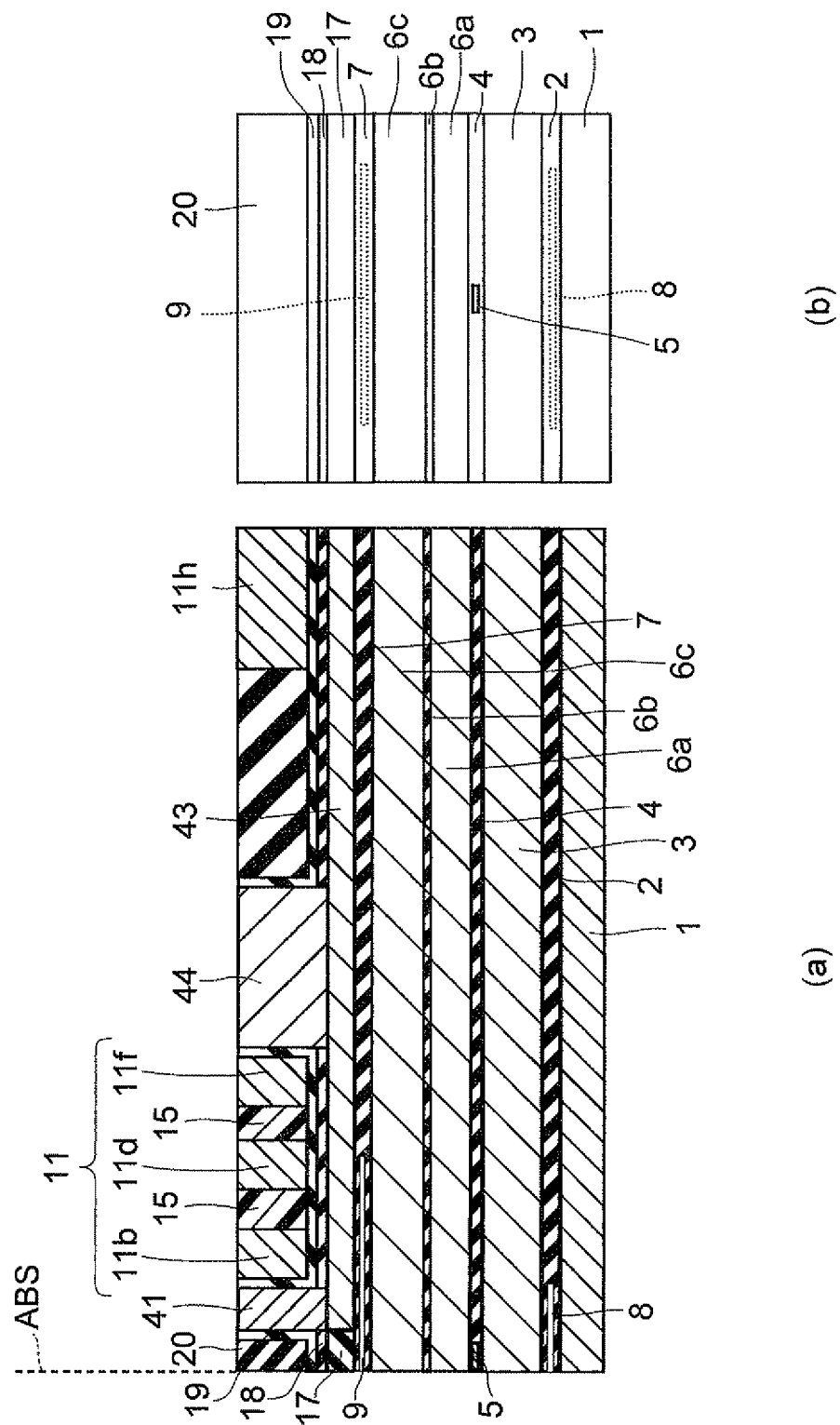
FIG. 13 illustrates a step subsequent to that of FIG. 12, in which (a) is a sectional view corresponding to FIG. 1, in which (b) is a front view corresponding to FIG. 2.
Figure 14:
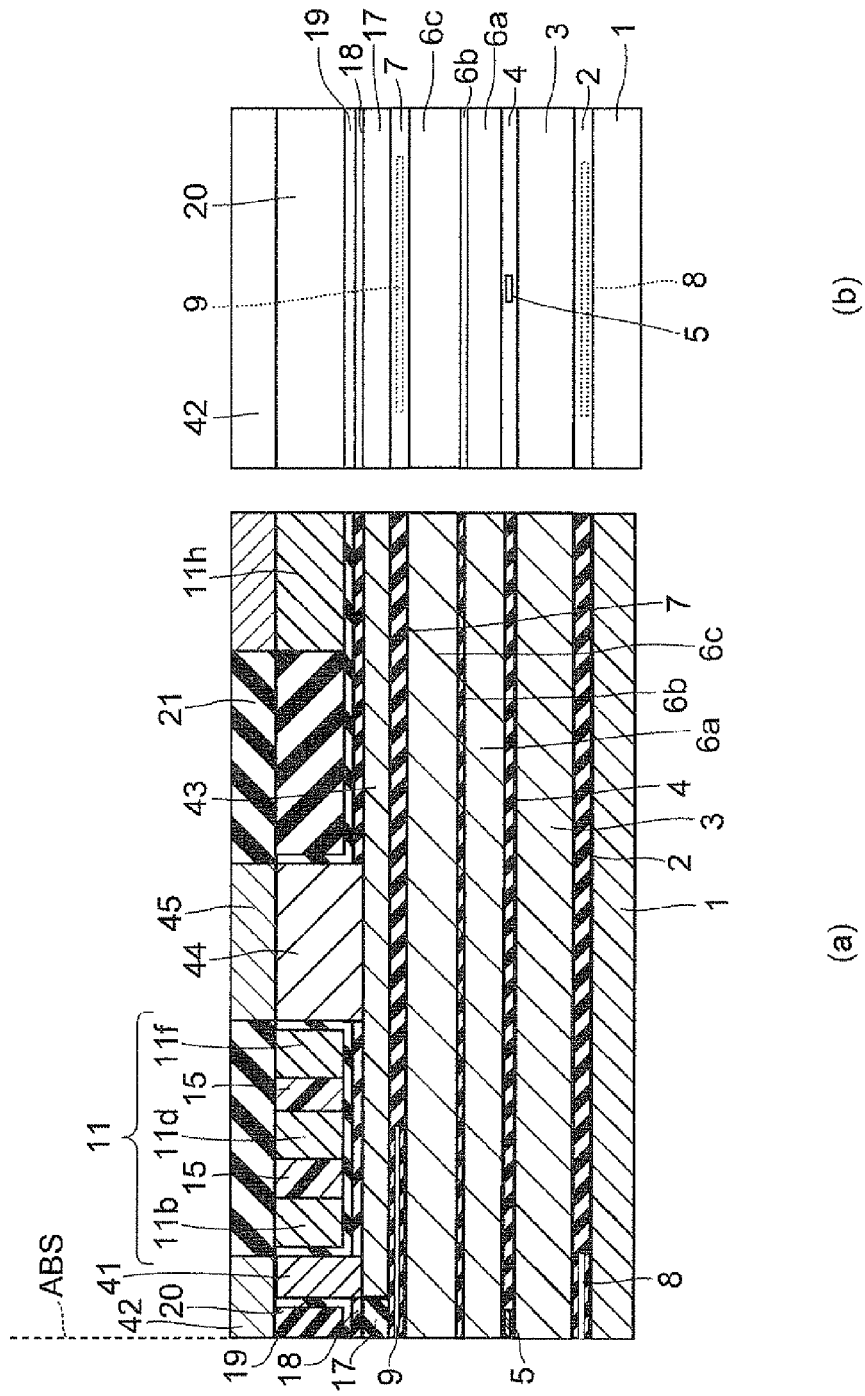
FIG. 14 illustrates a step subsequent to that of FIG. 13, in which (a) is a sectional view corresponding to FIG. 1, in which (b) is a front view corresponding to FIG. 2.

To begin with, the structure of a thin-film magnetic head of perpendicular magnetic recording type according to the first embodiment of the present invention will be explained with reference to FIG. 1 to FIG. 9. Here, FIG. 1 is a sectional view of the thin-film magnetic head 300 according to a first embodiment of the present invention taken along the line 1-1 of FIG. 2, along by a direction intersecting its air bearing surface (which will hereinafter be referred to as "ABS"), FIG. 2 is a front view illustrating the ABS 30 of the thin-film magnetic head 300. FIG. 3 is a plan view illustrating a lower thin-film coil 11. FIG. 4 is a plan view illustrating an upper thin-film coil 51. FIG. 5 is a plan view illustrating a principal part of the lower thin-film coil 11. FIG. 6 is a perspective view illustrating principal parts of an opposing shield part 61, an upper front shield part 62 and a linking shield part 63. FIG. 7 is a side elevation view illustrating a pre-trim shield part 62A and the upper front shield part 62. FIG. 8 illustrates a modified example, in which (a) is a side elevation view of the upper front shield part 62 not having a lateral flat part, in which (b) is a side elevation view of the upper front shield part 62 not having a longitudinal flat part. FIG. 9 is a sectional view illustrating a principal part of FIG. 1.

The thin-film magnetic head 300 comprises a substrate 1 and reproducing and recording heads laminated on the substrate 1, while having the ABS 30 as a medium-opposing surface opposing a recording medium. The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5.

The reproducing head further has an upper shield layer 6 made of a magnetic material formed on the shield gap film 4, and an insulating layer 7 formed on the upper shield layer 6. The reproducing head is arranged in a position closer to the substrate 1 than the recording head.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The upper shield layer 6 has an insulating part 6b in the middle thereof. Further, a first shield part 6a is formed on the lower side of the insulating part 6b and a second shield part 6c is formed on the upper side of the insulating part 6b.

In the thin-film magnetic head 300, a heating part 8 is formed in the insulating layer 2. The heating part 8 is also called a DFH (Disk flying heater) and has a function of generating heat by electric current flowing therethrough and conducting the heat to the upper shield layer 6 and the like. Further, a heat sensing part 9 is formed in the insulating layer 7. The heat sensing part 9 is also called an HDI (Head Disk Interlayer) sensor. The heat sensing part 9 is formed using an element which senses heat (temperature) near the upper shield layer 6 and changes in resistance value according to the sensed heat.

Further, in the thin-film magnetic head 300, the heating part 8 heats the upper shield layer 6 and the lower shield layer 3. The upper shield layer 6 and the lower shield layer 3 expand in volume by the heat received from the heating part 8. As a result, assuming that the upper shield layer 6 and the lower shield layer 3 come into contact with a recording medium not illustrated in FIG. 1, parts of the upper shield layer 6 and the lower shield layer 3 near the ABS 30 become heated due to friction. In the thin-film magnetic head 300, a judgment whether or not the upper shield layer 6 and the lower shield layer 3 have come into contact with the recording medium is made by detecting the change in resistance value of the heat sensing part 9 caused by the friction heat. Further, the frying height is controlled while controlling the current value flowing through the heating part 8 according to the judgment result.

The recording head has a lower thin-film coil 11, a main magnetic pole layer 26, a gap layer 29, a lower shield layer 40, an upper thin-film coil 51, an write shield layer 60, an upper yoke layer 65, a displacement suppression layer 85 and protective insulating layer 90, which are laminated on the substrate 1.

In the thin-film magnetic head 300, the lower thin-film coil 11 and the upper thin-film coil 51 form a continuous thin-film coil. The lower thin-film coil 11 corresponds to a part of the continuous thin-film coil, disposed between the main magnetic pole layer 26 and the substrate 1.

As illustrated in FIG. 3, the lower thin-film coil 11 has three turn parts 11b, 11d, 11f. The turn parts 11b, 11d, 11f are arranged between a later-described connecting shield part 41 and a first rear shield part 44. The lower thin-film coil 11 has a structure which the turn parts 11b, 11d, 11f align with each other while interposing a photoresist layer 15 therebetween. Since the turn part 11b is arranged at a closest position to the ABS 30 of the turn parts 11b, 11d, 11f, the turn part 11b corresponds to a front turn part. The turn part 11f corresponds to a rear turn part.

The lower thin-film coil 11 has a loop part 11a extending from a lead part 13A to the turn part 11b, a one-loop part 11c extending from the turn part 11b to the turn part 11d, and a one-loop part 11e extending from the turn part 11d to a turn part 11f, and a half-loop part 11g extending from the turn part 11f to a connecting part 11h.

The lower thin-film coil 11 is constructed as a continuous line from the lead part 13A to the connecting part 11, so as to be wound as a flat spiral about the lower shield layer 40, thus forming a three-turn loop as a whole. For convenience of illustration, FIG. 1 illustrates only the turn parts 11b, 11d, 11f and connecting part 11h in the lower thin-film coil 11. Each of the turn parts 11b, 11d, 11f has a longitudinally long structure in which the thickness (height in a direction (upper and lower direction) along with the ABS 30) greater than the lateral width. Note that the lateral width means width in a direction (intersecting direction) intersecting the ABS 30, in this embodiment.

In the lower thin-film coil 11, as illustrated in FIG. 5, the one-loop part 11c has a variable width structure in which the width gradually decreases toward the ABS 30 and becomes the smallest at the position closest to the ABS 30. Namely, when widths Wd1, Wd2, Wd0 are defined in the one-loop part 11c as illustrated in FIG. 5, Wd1>Wd2>Wd0. The narrowest part in the one-loop part 11c is the turn part 11d. The loop part 11a and the one-loop part 11e have a variable width structure similar to that of the one-loop part 11c, while the narrowest part is the turn part 11b, 11f. Here, the respective widths of the turn parts 11b, 11d, 11f are Wb0 (about 0.9 μm), Wd0 (about 0.9 μm) and Wf0 (about 0.9 μm).

The lower thin-film coil 11 forms a following continuous 3-turn loop. Namely, the lead part 13A is connected to the connecting part 11h through the loop part 11a, the one-loop part 11c, one-loop part 11e and the half-loop part 11g, whereby the 3-turn loop is formed.

Note that the distance from a front side face 11bf of the turn part 11b to the ABS 30 means a front distance of the lower thin-film coil 11. Besides, the distance from a rear side face 11fr of the turn part 11f to the ABS 30 means a rear distance of the lower thin-film coil 11.

Next, the upper thin-film coil 51 will be explained. As illustrated in FIG. 4, the upper thin-film coil 51 has three turn parts 51g, 51e, 51c. The turn parts 51g, 51e, 51c are arranged between a later-described upper front shield part 62 and a rear shield part 64. The upper thin-film coil 51 has a structure which the turn parts 51g, 51e, 51c align with each other while interposing a photoresist layer 55 therebetween. Since the turn part 51g is arranged at a closest position to the ABS 30 of the turn parts 51g, 51e, 51c, the turn part 51g corresponds to a front turn part. The turn part 51c corresponds to a rear turn part.

The upper thin-film coil 51 has a loop part 51b extending from a connecting part 51a to the turn part 51c, a one-loop part 51d extending from the turn part 51c to the turn part 51e, and a one-loop part 51f extending from the turn part 51e to a turn part 51g, and a half-loop part 51h extending from the turn part 51g to a lead part 14A.

The upper thin-film coil 51 is constructed as a continuous line from the connecting part 51a to the lead part 14A, so as to be wound as a flat spiral about the write shield layer 60, thus forming a three-turn loop as a whole. For convenience of illustration, FIG. 1 illustrates only the turn parts 51g, 51e, 51c and the connecting part 51a in the upper thin-film coil 51. Each of the turn parts 51g, 51e, 51c has the longitudinally long structure and the variable width structure similarly to the turn parts 11b, 11d, 11f. The narrowest part in the one-loop part 51f, one-loop part 51d and the loop part 51b are the turn part 51g, 51e, 51c respectively.

The upper thin-film coil 51 forms a following continuous 3-turn loop. Namely, the connecting part 51a is connected to the lead part 14A through the loop part 51b, the one-loop part 51d, one-loop part 51f and the half-loop part 51h, whereby the 3-turn loop is formed.

Figure 35:
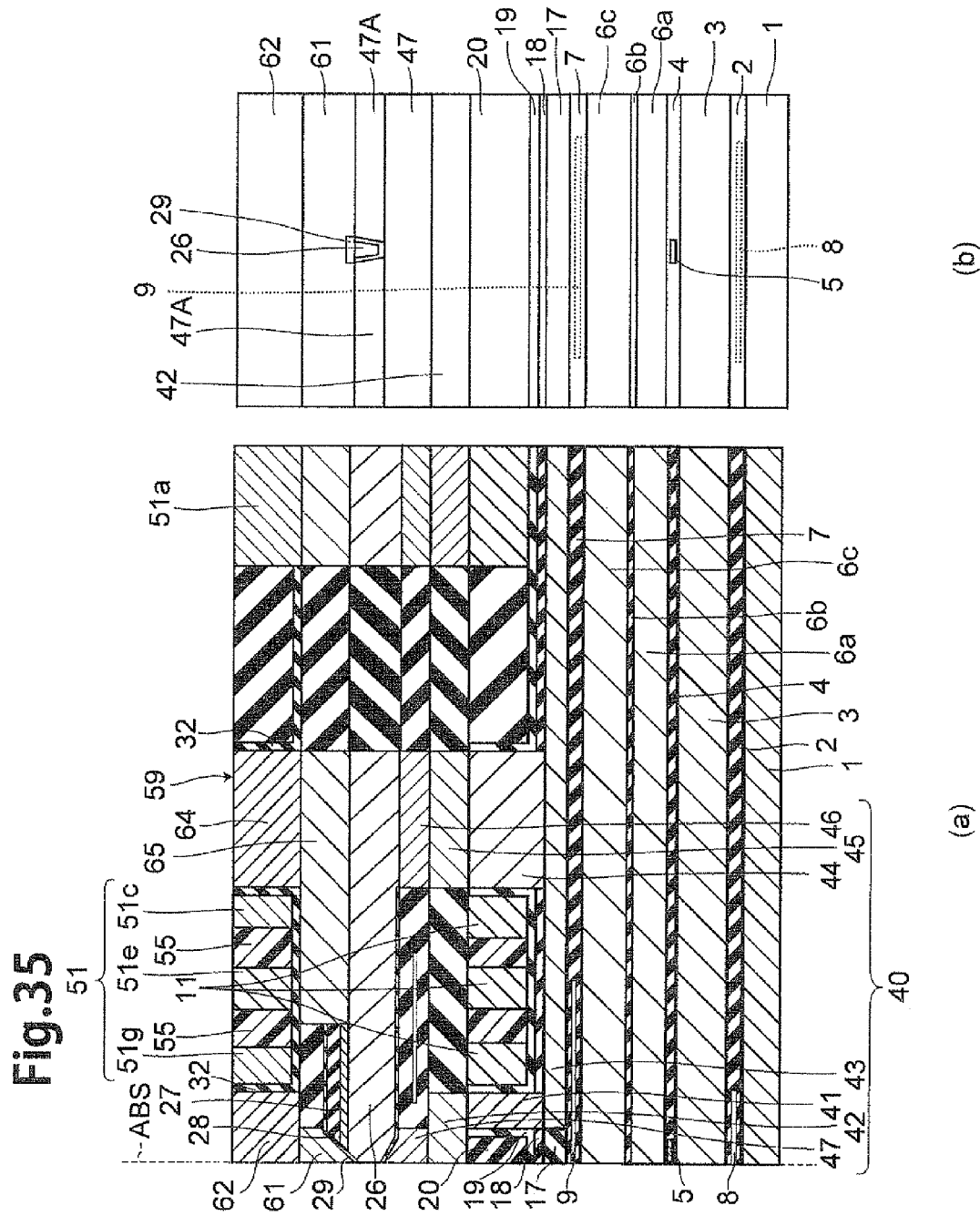
FIG. 35 illustrates a step subsequent to that of FIG. 34 in which (a) is a sectional view corresponding to FIG. 1, in which (b) is a front view corresponding to FIG. 2.
Figure 36:
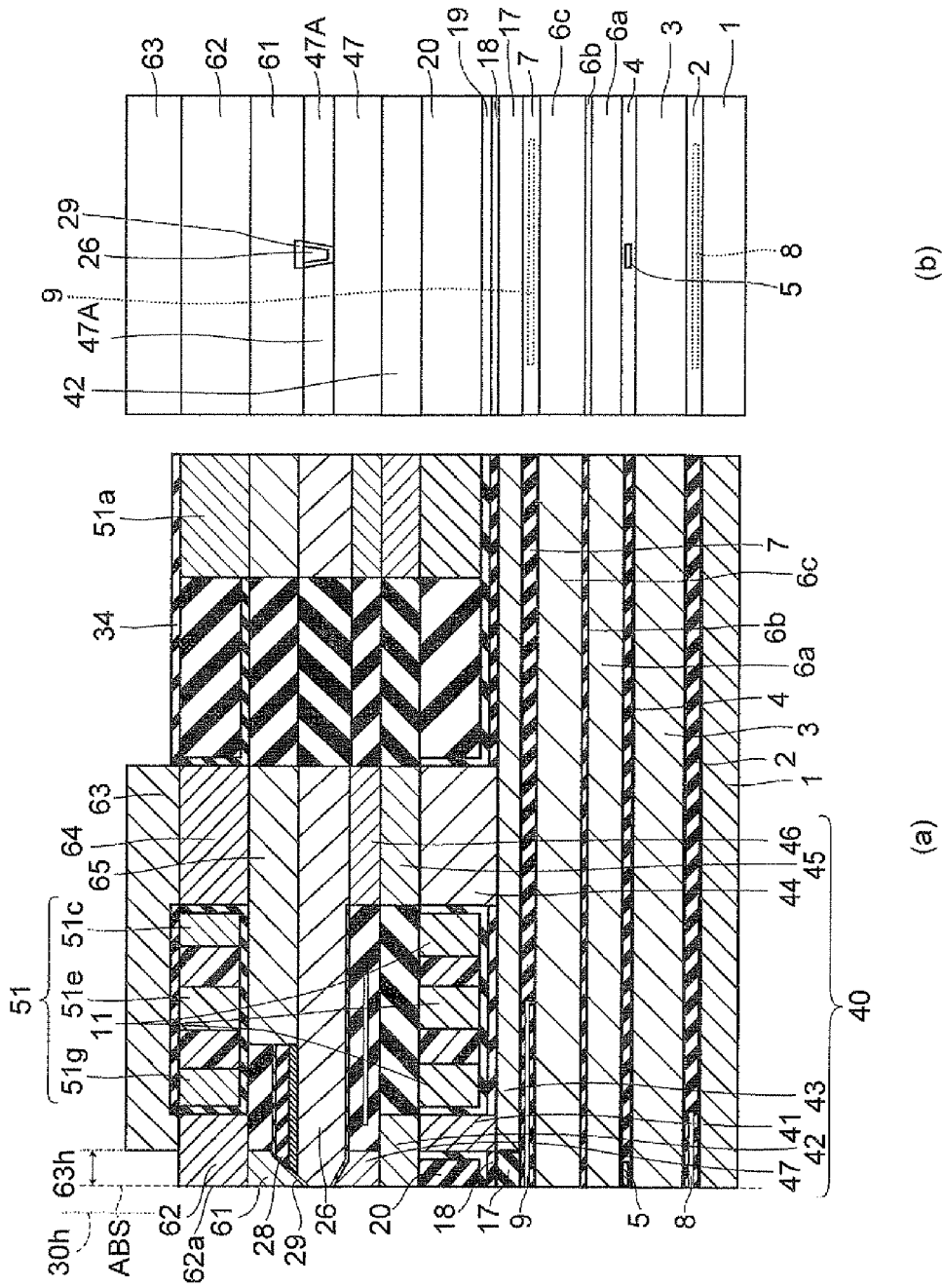
FIG. 36 illustrates a step subsequent to that of FIG. 35 in which (a) is a sectional view corresponding to FIG. 1, in which (b) is a front view corresponding to FIG. 2.
Figure 37:
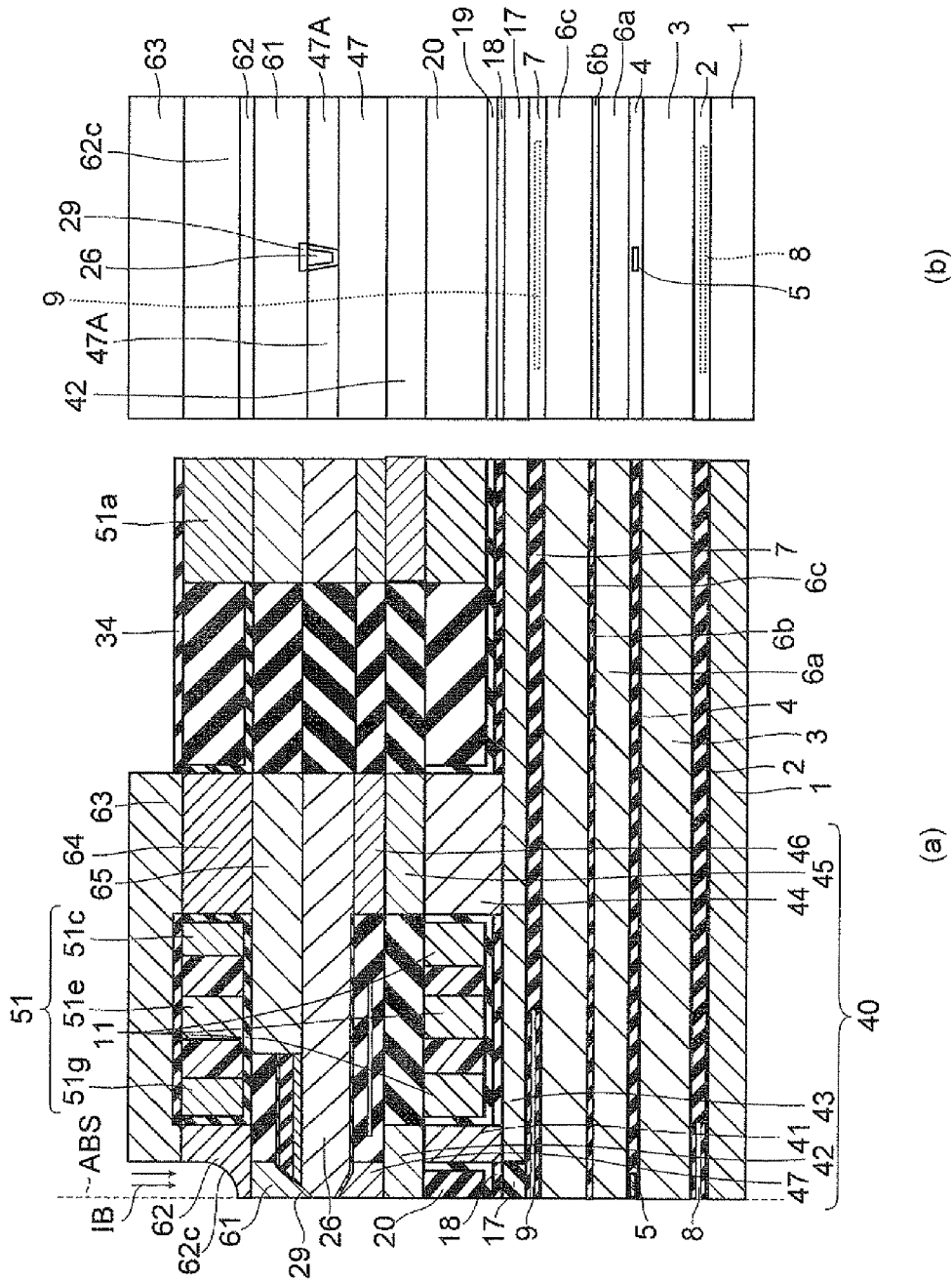
FIG. 37 illustrates a step subsequent to that of FIG. 36 in which (a) is a sectional view corresponding to FIG. 1, in which (b) is a front view corresponding to FIG. 2.

Further, as illustrated in FIG. 1, the upper thin-film coil 51 has an upper end face 51A. The upper end face 51A is disposed at a position most distanced from the substrate 1. The upper end face 51A is formed without level difference to a later-described shield upper end face 62f to form a common flat surface 59 (see FIG. 35) together with the shield upper end face 62f. Further, the upper thin-film coil 51 is connected to an upper face of a later-described upper yoke layer 65 via only the interlayer insulating layer 32. The upper thin-film coil 51 is connected to the upper yoke layer 65 without a magnetic layer made of a magnetic material intervening therebetween.

In the thin-film magnetic head 300, the connecting part 11h of the lower thin-film coil 11 is connected to the connecting part 51a of the upper thin-film coil 51. By this, the lower thin-film coil 11 and the upper thin-film coil 51 form a series of coils. A current corresponding to data to be recorded on a recording medium is flowed through the lower thin-film coil 11 and the upper thin-film coil 51, a recording magnetic field is generated by the current.

Next, the main magnetic pole layer 26 will be explained. The main magnetic pole layer 26 is formed using a magnetic material made of a ferromagnetic body such as NiFe, CoNiFe, CoFe or the like. The ferromagnetic body such as NiFe, CoNiFe, CoFe or the like has a high magnetic permeability. Therefore, a magnetic flux is likely to transmit through the main magnetic pole layer 26, much more magnetic flux transmit through the main magnetic pole layer 26. For this reason, more strong magnetic flux corresponding to the recording magnetic field is emitted from the main magnetic pole layer 26 to the ABS 30.

The main magnetic pole layer 26 has a magnetic pole end face 26a on the ABS 30 side, as illustrated in FIG. 2, FIG. 9. The magnetic pole end face 26a has a bevel form which is wider on the upper thin-film coil 51 side than on the lower thin-film coil 11 side and gradually decreases its width toward the lower thin-film coil 11. The width of the magnetic pole end face 26a on the upper thin-film coil 51 side defines the track width. The track width is about 0.06 to 0.12 µm, for example. The magnetic pole end face 26a is positioned on the ABS 30.

The main magnetic pole layer 26 includes a track width determining part having the magnetic pole end face 26a, a wider part and a width extending part. The track width determining part has a fixed width regardless of the distance from the ABS 30. The wider part is arranged at a position distanced more from the ABS 30 than is the track width determining part and has a width greater than that of the track width determining part. The wider part has the same width as that of the track width determining part at the boundary with the track width determining part, gradually increases the width as it is distanced more from the ABS 30. The width extending part has a fixed width greater than the wider part. In this embodiment, a part from the magnetic pole end face 26a until the width begins to increase is defined as the track width determining part.

Further, as illustrated in FIG. 9, in the main magnetic pole layer 26, an upper tilted surface 26c and a lower tilted surface 26e are formed in the track width determining part.

The upper tilted surface 26c is formed in an ascending slope like shape distanced more from the substrate 1 as it is distanced more from the ABS 30. The upper tilted surface 26c is connected to the magnetic pole end face 26a and an upper end face 26d.

The lower tilted surface 26e is formed in a descending slope like shape closer to the substrate 1 as it is distanced more from the ABS 30. The lower tilted surface 26e is connected to the magnetic pole end face 26a and the lower end face 26f of the wider part. The lower tilted surface 26e is formed from the track width determining part to wider part. The lower end face 26f is disposed on the nearest position to the substrate 1 in the main magnetic pole layer 26.

Further, in the main magnetic pole layer 26, nonmagnetic layers 27, 28 are laminated on a part of the upper end face 26d between an opposing shield part 61 and the upper yoke layer 65 which will be explained later, as also illustrated in FIG. 1.

A length of the above-described track width determining part from the ABS 30 is referred to as neck height. The neck height is about 0.05 to 0.3 µm, for example.

The gap layer 29 is formed along the upper tilted surface 26c and the upper end face 26d of the main magnetic pole layer 26 between the opposing shield part 61, the insulating layer 31 and the main magnetic pole layer 26, the nonmagnetic layers 27, 28. The gap layer 29 is formed so as to cover the upper tilted surface 26c and the upper end face 26d. The gap layer 29 is made of an insulating material such as alumina ($Al_2O_3$), nonmagnetic conductive material such as Ru, NiCu, Ta.

Next, the lower shield layer 40 and the write shield layer 60 will be explained. As illustrated in FIG. 1, FIG. 9, the lower shield layer 40 and the write shield layer 60 are disposed so as to sandwich the main magnetic pole layer 26 between them.

The lower shield layer 40 is arranged on the substrate 1 side of the main magnetic pole layer 26. The lower shield layer 40 includes a leading shield part 47 and side shield parts 47A arranged in the ABS 30 as illustrated also in FIG. 2 and is a multiple shield layer in which the two shield parts overlie each other.

Further, the lower shield layer 40 has the connecting shield part 41, a lower front shield part 42, a linking shield part 43, a first rear shield part 44, a second rear shield part 45, a third rear shield part 46, and a partial lower seed layer 91, in addition to the leading shield part 47 and the side shield part 47A. The lower shield layer 40 is formed using a magnetic material made of a ferromagnetic body such as NiFe, CoNiFe, CoFe or the like.

The connecting shield part 41 and lower front shield part 42 are arranged closer to the ABS 30 than are the lower thin-film coil 11. Besides, one part of the lower front shield part 42 overlies the connecting shield part 41. The connecting shield part 41 is arranged at a position distanced from the ABS 30. But, the lower front shield part 42 has a shield end face 42a arranged within the ABS 30 (see FIG. 9).

The linking shield part 43 is formed such as to straddle the turn parts 11b, 11d, 11f of the lower thin-film coil 11, and connects the connecting shield part 41 and the first rear shield part 44 to each other. The linking shield part 43 has a function as a return pole which backs the magnetic flux emitted from the main magnetic pole layer 26.

The first, second, third rear shield parts 44, 45, 46 are arranged farther from the ABS 30 than are the turn parts 11b, 11d, 11f of the lower thin-film coil 11. The second rear shield part 45 overlies the first rear shield part 44, the third rear shield parts 46 overlies the second rear shield part 45. The first, second, third rear shield parts 44, 45, 46 form a three-stage structure in which their respective front side faces closer to the ABS 30 are equidistant from the ABS 30. The first, second, third rear shield parts 44, 45, 46 has a function as a linking part which link the linking part 43 to the main magnetic pole layer 26.

The leading shield part 47 corresponds to a first lower shield part according to the embodiment of the present invention. The leading shield part 47 is connected to the lower front shield part 42 and the side shield parts 47A, 47A are formed on its upper face on the opposite side. The leading shield part 47 has a shield end face 47*a* arranged in the ABS 30 (see FIG. 9).

The side shield parts 47A, 47A correspond to second lower shield parts according to the embodiment of the present invention. The side shield parts 47A, 47A are formed on the leading shield part 47. The side shield parts 47A, 47A are arranged on both sides in the track width direction of the main magnetic pole layer 26 respectively. The side shield parts 47A, 47A also have shield end faces 47A*a* arranged in the ABS 30 respectively (see FIG. 2). The side shield parts 47A, 47A and the leading shield part 47 are formed to surround the magnetic pole end face 26*a* via a nonmagnetic thin-film 25 and arranged near the main magnetic pole layer 26.

The partial lower seed layer 91 is a metal layer used as a ground when the side shield parts 47A, 47A are formed on the leading shield part 47 by electro plating. The partial lower seed layer 91 is formed by sputtering or the like under a dry environment. The partial lower seed layer 91 is formed using a magnetic material such as CoNiFe, CoFe, NiFe.

Further, the partial lower seed layer 91 is formed only in a partial area in a lower thin-film-like space having a very small thickness sandwiched between the leading shield part 47 and the side shield parts 47A, 47A. The whole partial lower seed layer 91 is arranged at a position distanced from the ABS 30.

Figure 17:
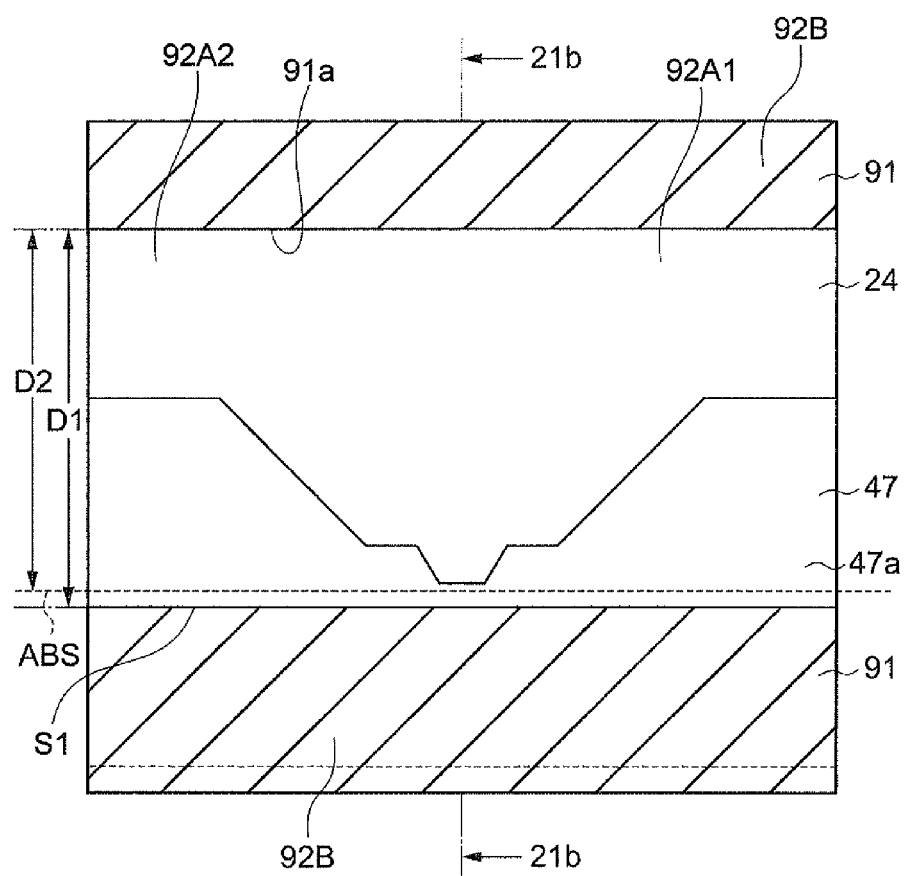
FIG. 17 is a plan view illustrating a principal part of a multilayer body in a step subsequent to that of FIG. 16.
Figure 18:
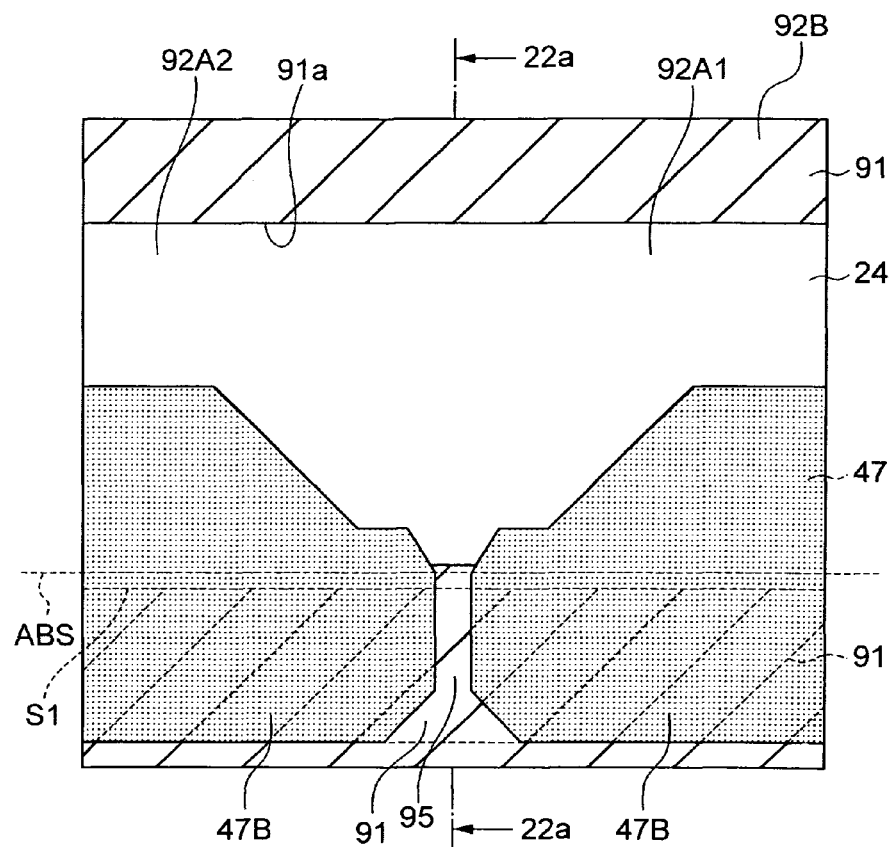
FIG. 18 is a plan view illustrating a principal part of a multilayer body in a step subsequent to that of FIG. 17.

In more detail, the partial lower seed layer 91 has a partial arrangement structure. In other words, the partial lower seed layer 91 is arranged only on a later-described lower formation zone 92B as illustrated in FIG. 17, FIG. 18. The lower formation zone 92B corresponds to an area of the front surface of a multilayer body except a lower exception zone 92A1 at the stage before the formation of the ABS 30. Further, at the stage after the formation of the ABS 30, the lower formation zone 92B corresponds to an area of the surface of the multilayer body except a lower absence zone 92A2 and recesses from the ABS 30.

In the thin-film magnetic head 300, all of a seed layer that is a ground when forming the side shield parts 47A, 47A is removed from the front surface of the lower absence zone 92A2. The lower absence zone 92A2 is arranged in the above-described lower thin-film-like space and corresponds to a rectangular area having a depth D2 along a later-described depth direction from a later-described planned line (or the ABS 30). In the lower absence zone 92A2, an end face 91*a* of the partial lower seed layer 91 appears (see FIG. 17, FIG. 21(*b*)). The end face 91*a* does not appear in the ABS 30 (see FIG. 27, FIG. 30, FIG. 30).

Further, the write shield layer 60 will be explained. The write shield layer 60 corresponds to an upper shield layer according to the embodiment of the present invention. The write shield layer 60 has an opposing shield part 61, an upper front shield part 62, a linking shield part 63, a rear shield part 64 and a wide upper seed layer 93.

The opposing shield part 61 corresponds to a first upper shield part according to the embodiment of the present invention. The opposing shield part 61 has a shield end face 61*a* disposed in the ABS 30 (see FIG. 9). The opposing shield part 61 opposes the leading shield part 47 within the ABS 30. Besides, a very small space which the gap layer 29 is arranged is formed in the shield end face 61*a* of the opposing shield part 61. A part of ABS 30 side of the gap layer 29 is formed in the very small space. The opposing shield part 61 is formed such as to oppose the main magnetic pole layer 26, nonmagnetic layer 27, and nonmagnetic layer 28 sequentially from the ABS 30 side through the gap layer 29. The opposing shield part 61 has a flat upper face, to which the upper front shield part 62 is connected.

The upper front shield part 62 is arranged closer to the ABS 30 than are the upper thin-film coil 51. This upper front shield part 62 will be explained with reference to FIG. 6, FIG. 7.

The upper front shield part 62 has a shield front end face 62*b*, a shield upper end face 62*f*, a shield connecting part 62*c*, and a shield lower end face 62*r*. The shield front end face 62*b* is disposed in the ABS 30. The shield front end face 62*b* is exposed in the ABS 30. In FIG. 6, a part with cross-hatching represents the shield front end face 62*b*. The shield upper end face 62*f* is disposed at a position distanced more from the substrate 1 than is the shield front end face 62*b*. The side distanced more from the substrate 1 is also called an upper side and the side closer to the substrate 1 is also called a lower side. The shield upper end face 62*f* is connected to the linking shield part 63. The shield upper end face 62*f* is formed along the direction intersecting the ABS 30. In addition, the shield upper end face 62*f* is formed separated from the ABS 30. The shield upper end face 62*f* has a size smaller than that of the shield lower end face 62*r*.

The shield connecting part 62*c* is a part connecting the shield front end face 62*b* to the shield upper end face 62*f*. The whole part of the shield connecting part 62*c* excepting a connecting part 62*x* with the shield front end face 62*b* is disposed at a position distanced from the ABS 30.

The shield connecting part 62*c* has a tilt structure tilted to be gradually distanced more from the ABS 30 as it gets closer, starting from the connecting part 62*x*, to a connecting part 62*y* connected to the shield upper end face 62*f*. The connecting part 62*x* is disposed in the ABS 30, but the connecting part 62*y* is disposed at a position distanced from the ABS 30 and thus receds from the ABS 30.

Further, as illustrated in FIG. 7, considering an imaginary flat surface 99 linking the connecting part 62*x* and the connecting part 62*y*, the flat surface 99 is a flat surface linking the shield front end face 62*b* and the shield upper end face 62*f* at a shortest distance. The shield connecting part 62*c* has a receding tilt structure tilted to be distanced more from the ABS 30 than is the flat surface 99. Further, the shield connecting part 62*c* has a lateral flat part 62*c*1, a longitudinal flat part 62*c*2, and a curved part 62*c*3 and has a structure that they are smoothly linked together into one body. The lateral flat part 62*c*1 is generally formed along the direction intersecting the ABS 30. The longitudinal flat part 62*c*2 is generally formed along the ABS 30.

The shield lower end face 62*r* is formed along the direction intersecting the ABS 30. The shield lower end face 62*r* has a size reaching the ABS 30. The shield lower end face 62*r* has a size larger than that of the shield upper end face 62*f*. The shield lower end face 62*r* is connected with the opposing shield part 61 on the ABS 30 side, and connected with the insulating layer 31 on the rear side of the shield lower end face 62*r* distanced more from the ABS 30.

The upper front shield part 62 has the above-described structure and therefore has an end face disposed in the ABS 30 that is smaller in size and in volume than that of the pre-trim front shield part 62A (the upper side in FIG. 7). The pre-trim front shield part 62A is a front shield part immediately before it is formed by performing a later-described trimming step. The pre-trim front shield part 62A has the shield upper end face 62f reaching the ABS 30 and has a pre-trim front end face 62a. Comparing the sizes of the pre-trim front end face 62a and the shield front end face 62b, the shield front end face 62b<the pre-trim front end face 62a.

Next, the linking shield part 63 will be explained. The linking shield part 63 is formed such as to straddle the turn part 51g, 51e, 51c of the upper thin-film coil 51. The linking shield part 63 is formed separated from the ABS 30. The linking shield part 63 is connected to the upper front shield part 62 and the rear shield part 64.

The rear shield part 64 is arranged at a position distanced more from the ABS 30 than is the turn part 51g, 51e, 51c of the upper thin-film coil 51. The rear shield part 64 is connected to the linking shield part 63 and the upper yoke layer 65. A height of the rear shield part 64 is equal to a height of the upper front shield part 62. Therefore, the rear shield part 64 forms a common flat surface 59 together with the upper thin-film coil 51 and shield upper end face 62f.

Figure 32:
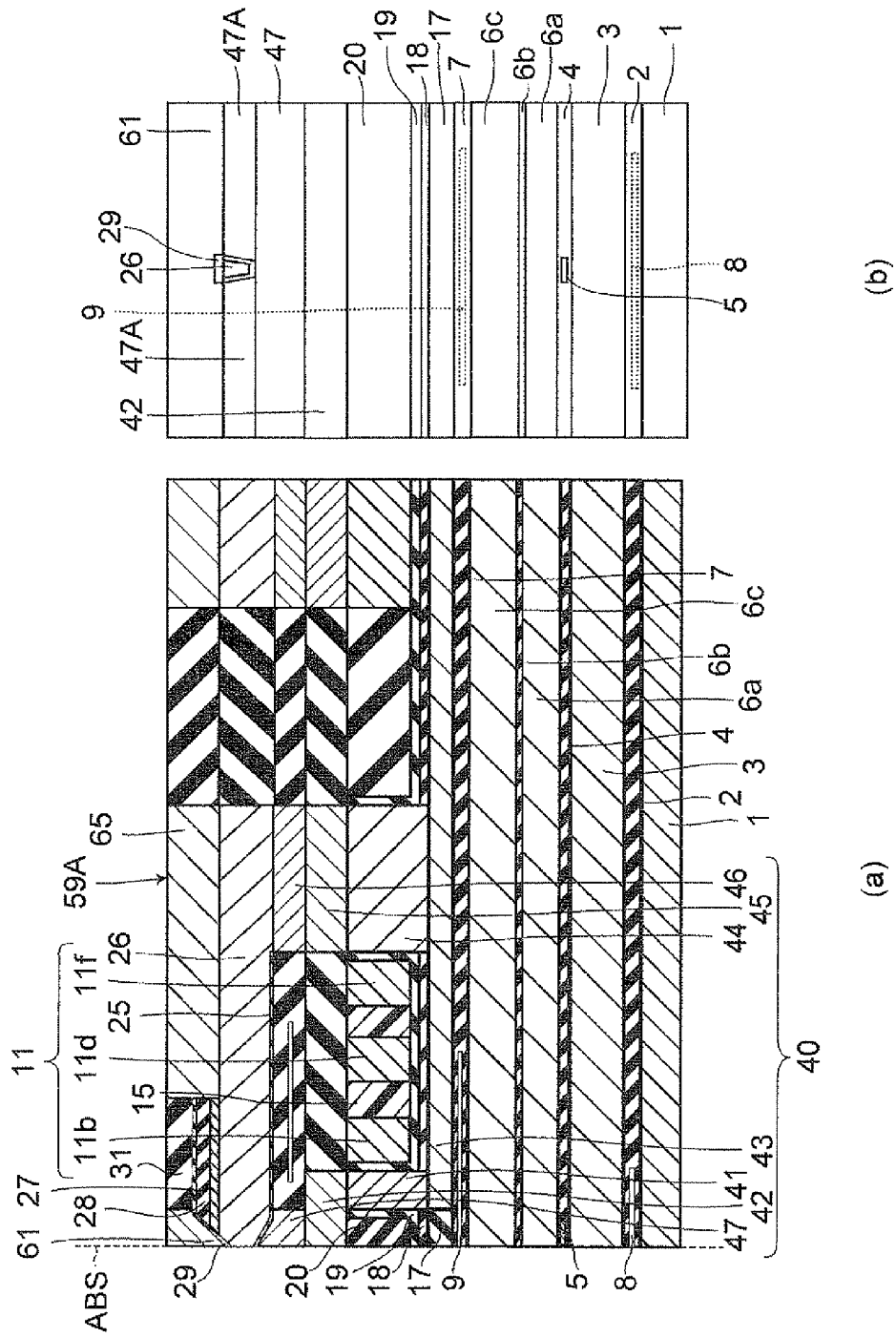
FIG. 32 illustrates a step subsequent to that of FIG. 28 in which (a) is a sectional view corresponding to FIG. 1, in which (b) is a front view corresponding to FIG. 2.
Figure 33:
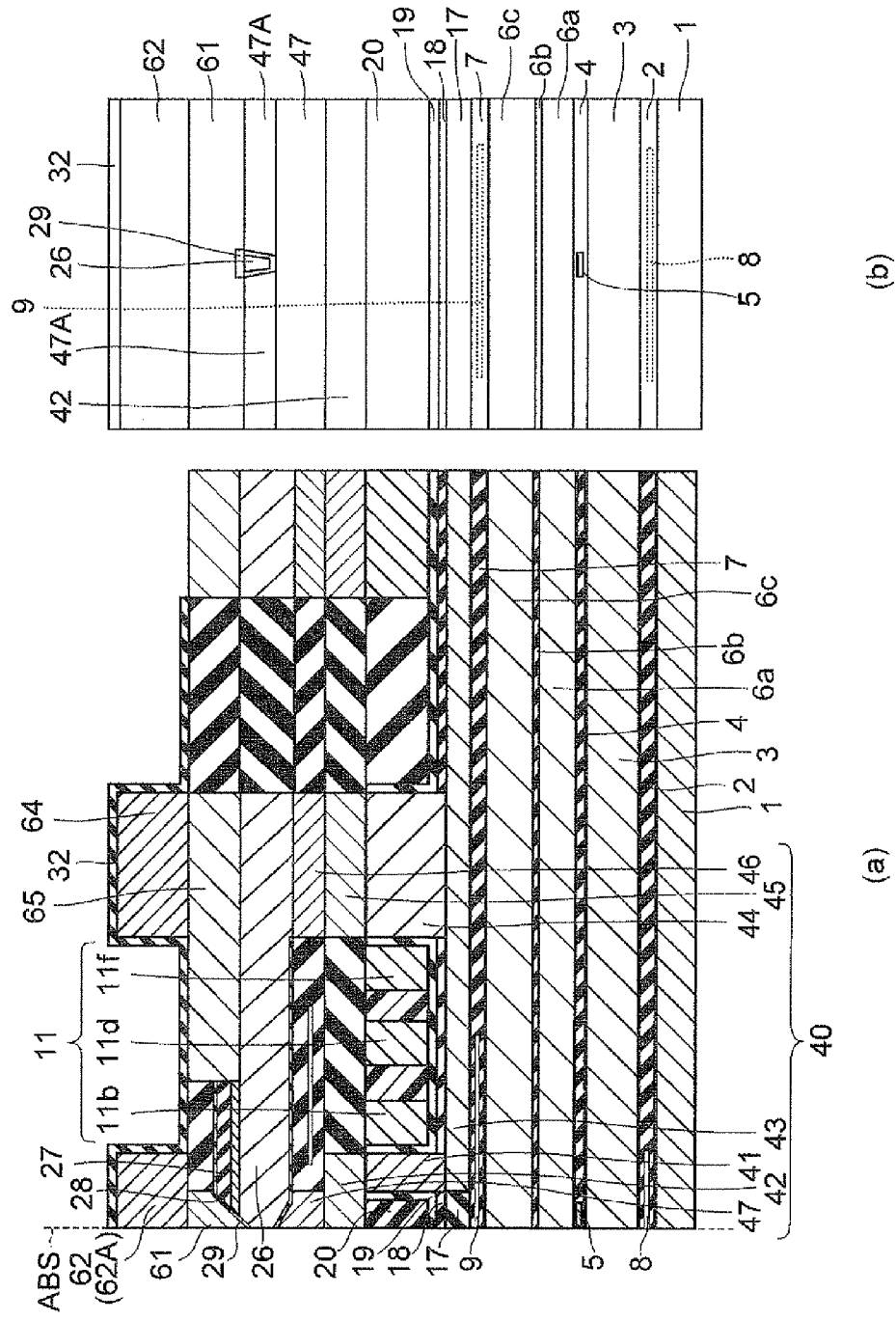
FIG. 33 illustrates a step subsequent to that of FIG. 32 in which (a) is a sectional view corresponding to FIG. 1, in which (b) is a front view corresponding to FIG. 2.
Figure 34:
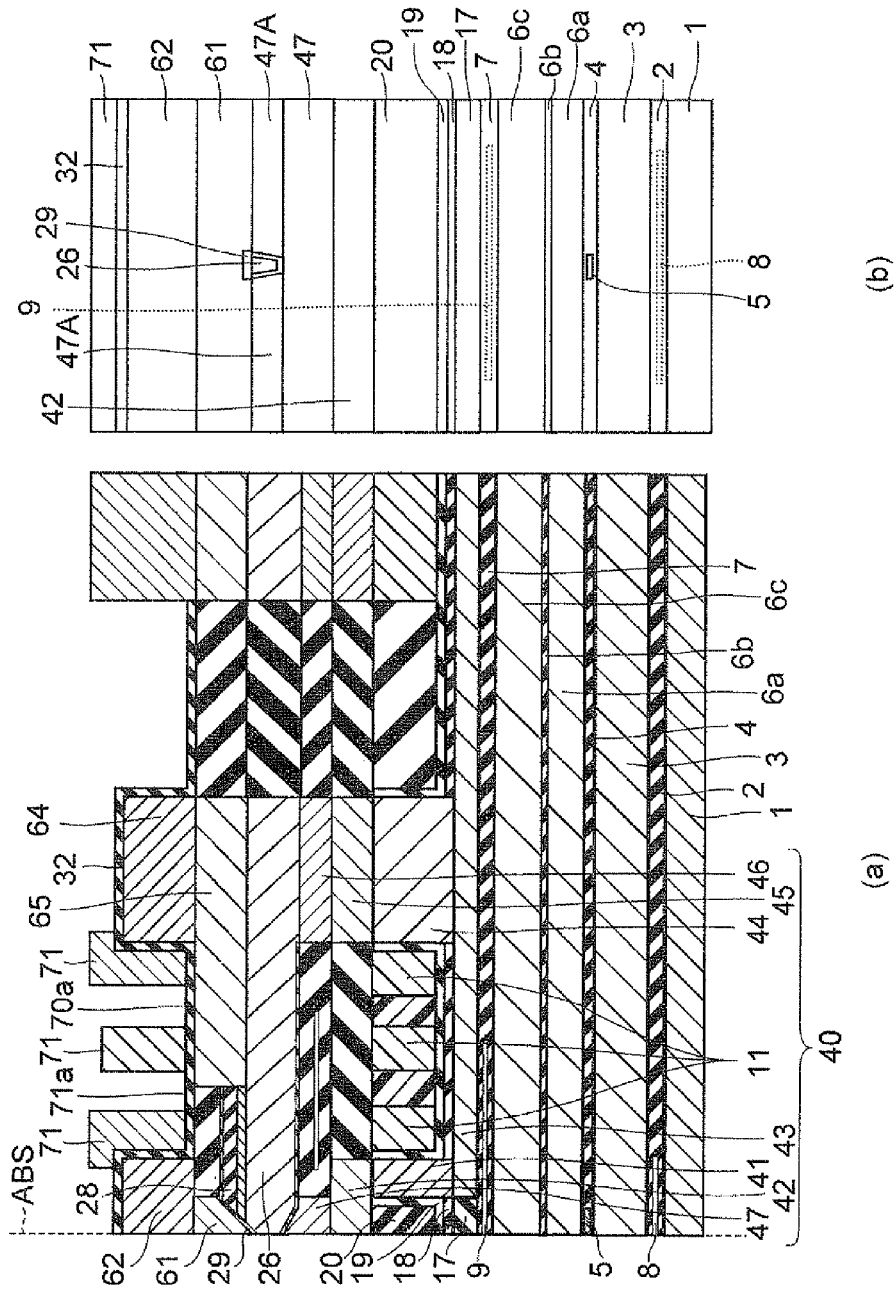
FIG. 34 illustrates a step subsequent to that of FIG. 33 in which (a) is a sectional view corresponding to FIG. 1, in which (b) is a front view corresponding to FIG. 2.

The upper yoke layer 65 is connected to a rear side of the upper end face 26d in the main magnetic pole layer 26, distanced more from the ABS 30 than is the nonmagnetic layers 27, 28. An upper end face of the upper yoke layer 65 is formed without level difference to an upper end face of the opposing shield part 61. The upper end face of the upper yoke layer 65 forms a common flat surface 59A (see FIG. 32) together with the upper end face of the opposing shield part 61.

Figure 30:
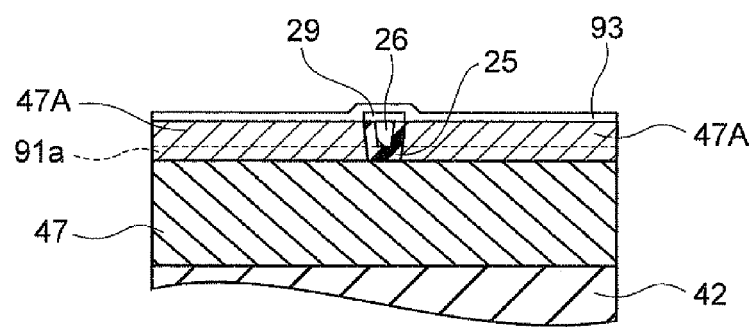
FIG. 30 is a sectional view illustrating a principal part of multilayer body when the multilayer body is cut along a planned line, in a step subsequent to that of FIG. 27.
Figure 31:
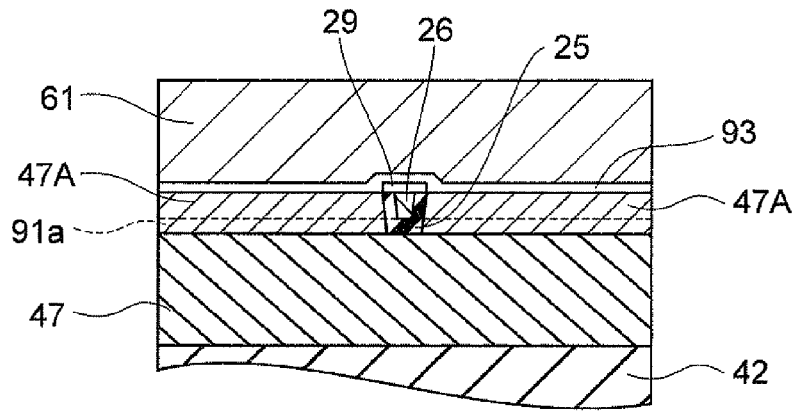
FIG. 31 is a sectional view illustrating a principal part of multilayer body when the multilayer body is cut along a planned line, in a step subsequent to that of FIG. 30.

The wide upper seed layer 93 is a metal layer used as a ground when forming the opposing shield part 61 on the main magnetic pole layer 26 by electro plating. The wide upper seed layer 93 is formed in an upper thin-film-like space having a very small thickness sandwiched between the main magnetic pole layer 26, the nonmagnetic layers 27, 28 and the opposing shield part 61. The wide upper seed layer 93 does not have the partial arrangement structure and therefor appears in the ABS 30 as illustrated in FIG. 30, FIG. 31.

Moreover, the thin-film magnetic head 300 has a displacement suppression layer 85. The displacement suppression layer 85 is connected an upper end face of the linking shield part 63. The displacement suppression layer 85 is formed from a nonmagnetic material having a low coefficient of linear thermal expansion. For example, the displacement suppression layer 85 is preferably made of an inorganic or metal material, examples of which include SiC, AlN, $Si_3N_4$, and W (tungsten). It will be preferred in particular to use a nonmagnetic material having a high hardness for the displacement suppression layer 85. For example, the displacement suppression layer 85 is preferably made of SiC, which has a Vickers hardness higher than that of alumina.

Further, the thin-film magnetic head 300 has a protective insulating layer 90. The protective insulating layer 90 is formed using an insulating material such as alumina ($Al_2O_3$). The protective insulating layer 90 has an embedded part 90a and a cover part 90b. The embedded part 90a and the cover part 90b are formed in one body. The embedded part 90a comes in contact with an all of the shield connecting part 62c, and is embedded with no space between the shield connecting part 62c and the ABS 30. The cover part 90b is formed so as to cover the linking shield part 63 and the displacement suppression layer 85.

(Method of Manufacturing Thin-Film Magnetic Head)

A method of manufacturing the thin-film magnetic head 300 having the structure mentioned above will now be explained with reference to FIG. 10(a), FIG. 10(b) to FIG. 14(a), FIG. 14(b), FIG. 15 to FIG. 20, FIG. 21(a), FIG. 21(b) to FIG. 26(a), FIG. 26(b), FIG. 27, FIG. 28(a), FIG. 28(b), FIG. 29 to FIG. 31, FIG. 32(a), FIG. 32(b) to FIG. 37(a), FIG. 37(b) together with FIG. 1, FIG. 2, FIG. 9 mentioned above.

FIG. 10(a) to FIG. 14(a), FIG. 26(a), FIG. 28(a), FIG. 32(a) to FIG. 37(a) is sectional view corresponding to FIG. 1 in respective step of manufacturing the thin-film magnetic head 300, while FIG. 10(b) to FIG. 14(b), FIG. 26(b), FIG. 28(b), FIG. 32(b) to FIG. 37(b) is front view similarly corresponding to FIG. 2. FIG. 15 to FIG. 20, FIG. 29 is a plan view illustrating a principal part of a multilayer body in a step of manufacturing the thin-film magnetic head 300. FIG. 21(a), FIG. 21(b) to FIG. 22(a), FIG. 22(b) is a sectional view taken along the line 21a-21a, the line 21b-21b, the line 22a-22a, the line 22b-22b of FIG. 16 to FIG. 19, respectively. FIG. 23(a), FIG. 23(b) to FIG. 25(a), FIG. 25(b), FIG. 27, FIG. 30 to FIG. 31 is a sectional view illustrating a principal part of multilayer body when the multilayer body is cut along a planned line, in a respective step of manufacturing the thin-film magnetic head 300. In each drawing, "ABS" represents a planned line which the ABS 30 will be formed later.

First, the substrate 1 made of a ceramic material such as aluminum oxide-titanium carbide ($Al_2O_3$.TiC) is prepared. Subsequently, as illustrated in FIG. 10(a), FIG. 10(b), the insulating layer 2 made of an insulating material such as alumina ($Al_2O_3$) and the lower shield layer 3 made of a magnetic material are successively formed on the substrate 1. The heating part 8 is formed when the insulating layer 2 is formed.

Then, the shield gap film 4 is formed by an insulating material such as to shield the MR device 5. Here, an undepicted lead connected to the MR device 5 is formed, and the MR device 5 and the lead are covered with the shield gap film 4. Thereafter, using a magnetic material and an insulating material, the upper shield layer 6 (the first shield part 6a, the insulating part 6b, the second shield part 6c) is formed on the shield gap film 4.

Next, the insulating layer 7 for separating the upper shield layer 6 and a recording head to be formed later from each other is formed by an insulating material such as alumina ($Al_2O_3$). The heat sensing part 9 is formed when the insulating layer 7 is formed. The foregoing steps yield a multilayer body for forming the recording head.

Subsequently, the lower shield layer 40 is formed by performing a lower shield layer forming step. In this embodiment, the lower shield layer forming step has a later-described first lower shield part forming step, a lower seed layer forming step and a second lower shield part forming step.

Further, in case of forming the lower shield layer 40, first, a magnetic layer (having a thickness of about 0.6 μm) for forming the linking shield part 43 is formed by using a magnetic material such as NiFe or CoNiFe or the like, so as to form an insulating layer on the surface of the multilayer body, and the surface of the multilayer body is flattened by chemical mechanical polishing (hereinafter, referred to as "CMP"). This forms an opposing insulating layer 17 and the linking shield part 43. Here, the linking shield part 43 is formed such as to be separated from the ABS 30 by 0.3 to 1 μm (about 0.5 μm in this embodiment).

Subsequently, an insulating layer 18 (having a thickness of about 0.1 μm to 0.3 μm) made of alumina ($Al_2O_3$) is formed on the whole surface of the multilayer body. Then, after applying a photoresist to the whole surface of the multilayer body, patterning is performed with a predetermined photomask, so as to form a resist pattern (not depicted). Using this resist pattern as a mask, etching such as RIE is performed, so as to selectively perforate the insulating layer 18.

Next, a connecting shield part forming step is performed. In this step, by frame plating method, using a magnetic material made of a ferromagnetic body such as NiFe or CoNiFe or the like, the connecting shield part 41 and the first rear shield part 44 are formed by a thickness of about 1-1.5 μm each.

Next, as illustrated in FIG. 11(a), FIG. 11(b), an insulating layer 19 (having a thickness of about 0.02 μm to 0.3 μm, preferably about 0.1 μm to 0.2 μm) made of alumina ($Al_2O_3$) is formed on the whole surface of the multilayer body by CVD (Chemical Vapor Deposition) according to an atomic layer method. The insulating layer 19 is formed so as to cover the connecting shield part 41 and the first rear shield part 44.

Then, a conductor layer 70 is formed by performing a conductor layer forming step. The conductor layer 70 is formed to form the lower thin-film coil 11. In this step, first, a conductor layer 70 is formed between the connecting shield part 41 and the first rear shield part 44 by frame plating. The conductor layer 70 is formed such as to have two interstices 70a between the connecting shield part 41 and the first rear shield part 44 and come into contact with the connecting shield part 41 and the first rear shield part 44 through the insulating layer 19 without gaps. The conductor layer 70 is an intermittent conductor layer, since it is provided with interstices 70a.

Next, as illustrated in FIG. 12(a), FIG. 12(b), a photoresist layer 80 (having a thickness of about 1.5 μm to 2.5 μm) is formed so as to be embedded the two interstices 70a in the conductor layer 70. Next, an insulating film 20 adapted to cover the surface of the multilayer body is formed using alumina ($Al_2O_3$) by a thickness of about 3 μm to 4 μm. Subsequently, the surface of the multilayer body is polished by CMP until the connecting shield part 41 and the first rear shield part 44 emerge, so as to become flat.

This forms the lower thin-film coil 11 as illustrated in FIG. 13(a), FIG. 13(b). Besides, an opposing insulating layer 20 is also formed on the side closer to the ABS 30 than is the connecting shield part 41.

Subsequently, as illustrated in FIG. 14(a), FIG. 14(b), an insulating layer 21 (having a thickness of about 0.3 μm to 0.7 μm) made of alumina ($Al_2O_3$) is formed on the whole surface of the multilayer body. After that, the insulating layer 21 is selectively perforated.

Next, the lower front shield part 42 and the second rear shield part 45 are formed to overlie in the opened part each in a thickness of 0.5 μm to 1.2 μm by the frame plating method using a magnetic material made of a ferromagnetic body such as NiFe or CoNiFe. After that, the surface of the multilayer body is polished by CMP so as to become flat.

Then, as illustrated in FIG. 26(a), FIG. 26(b), the base insulating layer 24 is formed using an insulating material such as alumina ($Al_2O_3$) or the like. The heating part 23 is formed when the base insulating layer 24 is formed. After that, the base insulating layer 24 is selectively perforated.

Figure 26:
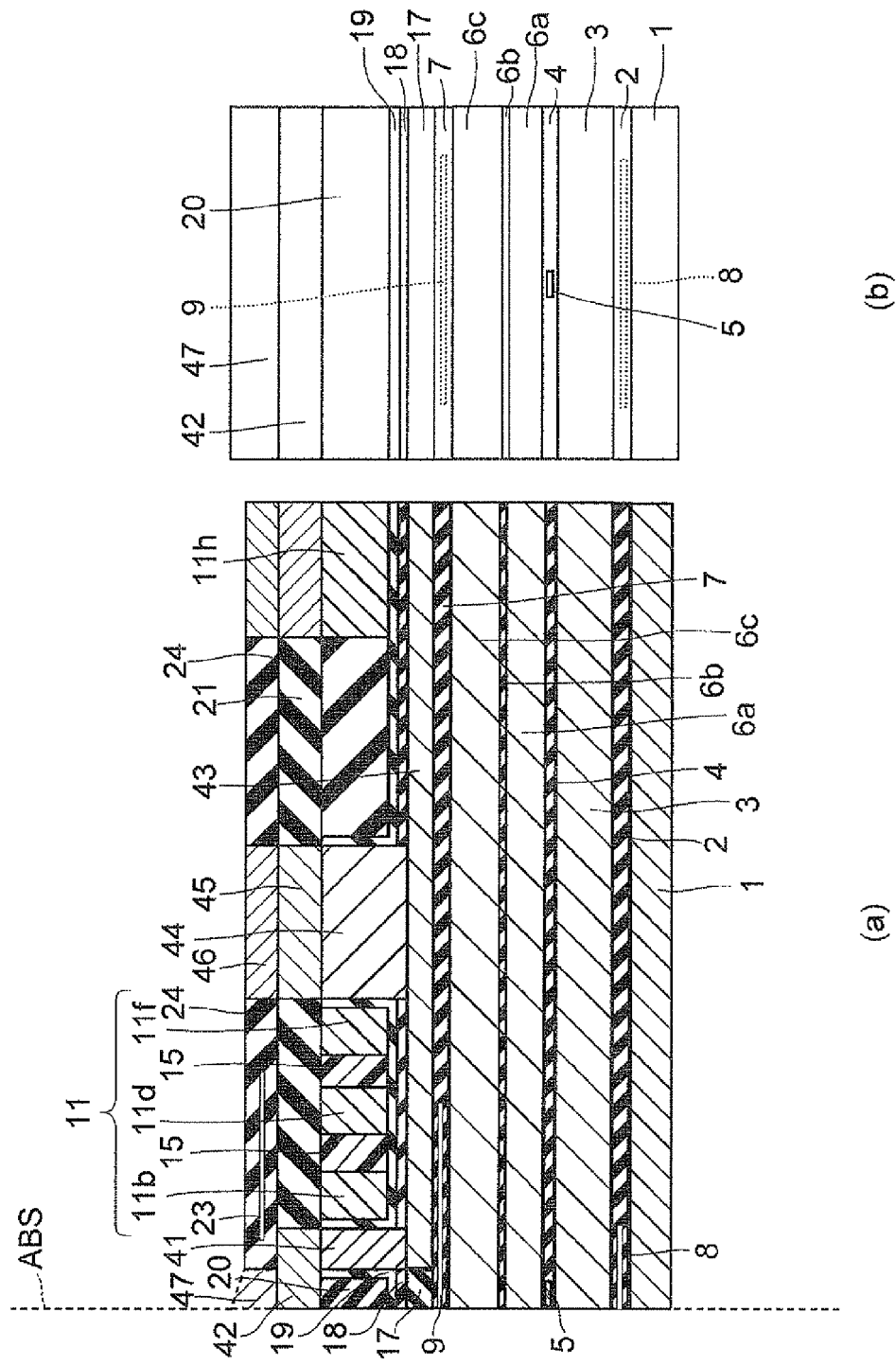
FIG. 26 illustrates a step subsequent to that of FIG. 14, in which (a) is a sectional view corresponding to FIG. 1, in which (b) is a front view corresponding to FIG. 2.

The leading shield part 47 is formed by performing a first lower shield part forming step. In this case, the leading shield part 47 is formed at a lower shield planned area 47B in a thickness of 0.5 μm to 1.0 μm by the frame plating method using a magnetic material made of a ferromagnetic body such as NiFe or CoNiFe. The lower shield planned area 47B is an area including a later-described planned line. As illustrated in FIG. 26, the lower shield planned area 47A is disposed on an ABS 30 side of the opened part. Besides, the third rear shield part 46 is formed on a part of the opened part, separated from the ABS 30 side.

Figure 15:
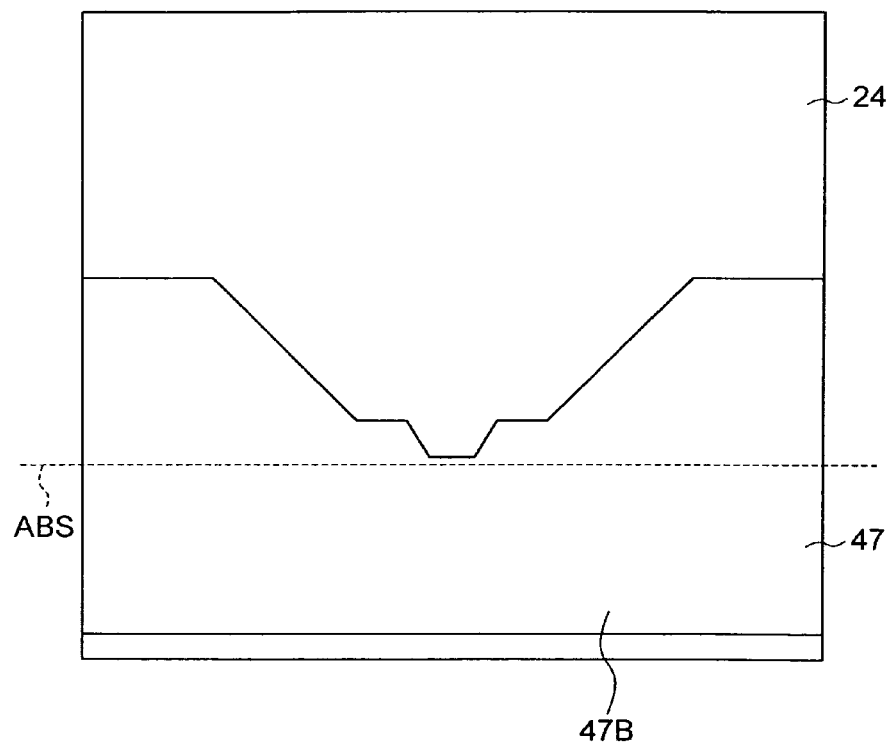
FIG. 15 is a plan view illustrating a principal part of a multilayer body in a step of manufacturing the thin-film magnetic head 300 according to a first embodiment of the present invention.

Then, as illustrated in FIG. 15, the leading shield part 47 is formed on the upper face of the multilayer body. However, the ABS 30 has not been formed yet at this moment. Therefore, the planned line can be assumed on the surface of the multilayer body as illustrated in FIG. 15. In FIG. 15, the line indicated by a broken line (the line indicated by "ABS") represents the planned line. The planned line is formed on the straight line along the ABS 30 formed later. The leading shield part 47 at this moment includes the planned line and also includes a part which will be removed at the completion, and therefore has a size larger than that at the completion.

Next, a lower seed layer forming step is performed to form the partial lower seed layer 91. In this embodiment, the lower seed layer forming step includes a later-described wide lower seed layer forming step and a lower seed layer removing step.

Figure 16:
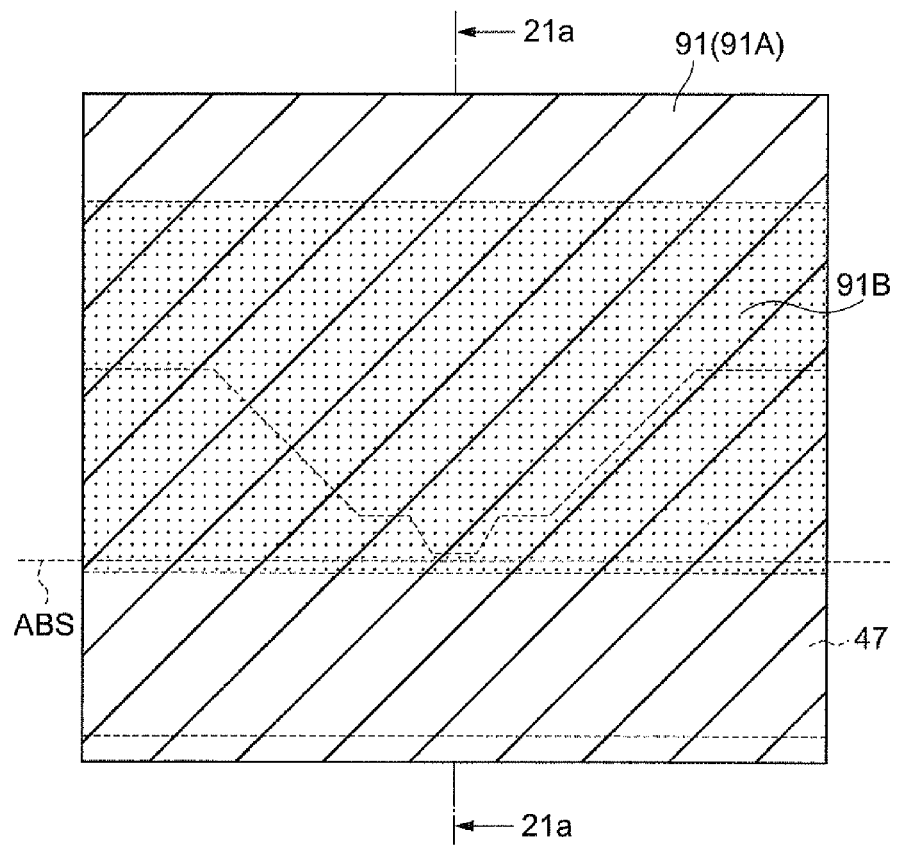
FIG. 16 is a plan view illustrating a principal part of a multilayer body in a step subsequent to that of FIG. 15.

Then, in the wide lower seed layer forming step, a wide lower seed layer 91A is formed on the upper face of the multilayer body as illustrated in FIG. 16. The wide lower seed layer 91A is a metal layer used as a ground when forming the side shield part 47A later by electro plating. The wide lower seed layer 91A is arranged on later-described lower exception zone 92A1 and lower formation zone 92B on the upper face of the multilayer body.

Subsequently, a lower seed layer removing step is performed. In this step, an excepted lower seed layer 91B of the wide lower seed layer 91A is removed by etching or the like as illustrated in FIG. 17. The excepted lower seed layer 91B corresponds to a part with dots in FIG. 16. The excepted lower seed layer 91B corresponds a part of the wide lower seed layer 91A formed on the lower exception zone 92A1. By the removal of the excepted lower seed layer 91B, the wide lower seed layer 91A becomes the partial lower seed layer 91. When cutting, along the planned line, the multilayer body when the excepted lower seed layer 91B is removed, the end face 91a of the partial lower seed layer 91 existing behind the section can be viewed as illustrated in FIG. 24(a).

Further, in the lower seed layer removing step, the lower exception zone 92A1 is set in a band-shaped area along the ABS 30 including the whole planned line as illustrated in FIG. 17. Further, as illustrated also in FIG. 21(b), a rectangular area having a depth D1 along the depth direction from an exception start line S1 is secured as the lower exception zone 92A1 (since the depth D1 is larger than the depth D2, D1>D2). The depth direction means the direction separating from the ABS 30 toward the position where the upper thin-film coil 51 will be formed later on the substrate 1 (more specifically, on the surface of the multilayer body). The exception start line S1 is set at a portion that is shifted outward (toward the opposite direction to the depth direction) from the planned line by, for example, about 0.01 to 0.1 μm.

By the performance of the lower seed layer removing step, the seed layer is removed from the area of the surface of the leading shield part 47 including the whole planned line, and an area where the seed layer does not exist (an area slightly larger than the above-described lower absence zone 92A2) is formed along the planned line. At this moment, the surface is exposed without being covered with the seed layer in the area of the leading shield part 47 including the whole planned line.

Next, a second lower shield part forming step is performed to form the side shield parts 47A, 47A as illustrated in FIG. 18, FIG. 22(a), FIG. 24(b). In this case, the side shield parts 47A, 47A are formed in the lower shield planned area 47A by frame plating method using a magnetic material made of a ferromagnetic body such as NiFe or CoNiFe by a thickness of about 0.5 μm to 1.0 μm each. Parts with dots in FIG. 18 correspond to the side shield parts 47A, 47A.

In this case, even after the lower seed layer removing step is performed, the partial lower seed layer 91 is formed in a part of the lower shield planned area 47A. Therefore, by growth of the plating film using the partial lower seed layer 91 as the ground, the side shield parts 47A, 47A are formed on the partial lower seed layer 91.

Note that the side shield parts 47A, 47A are not formed in a very narrow area 95 illustrated in FIG. 18. The very narrow area 95 means an area with a small width where the magnetic pole end face 26a of the main magnetic pole layer 26 will be arranged later.

Figure 19:
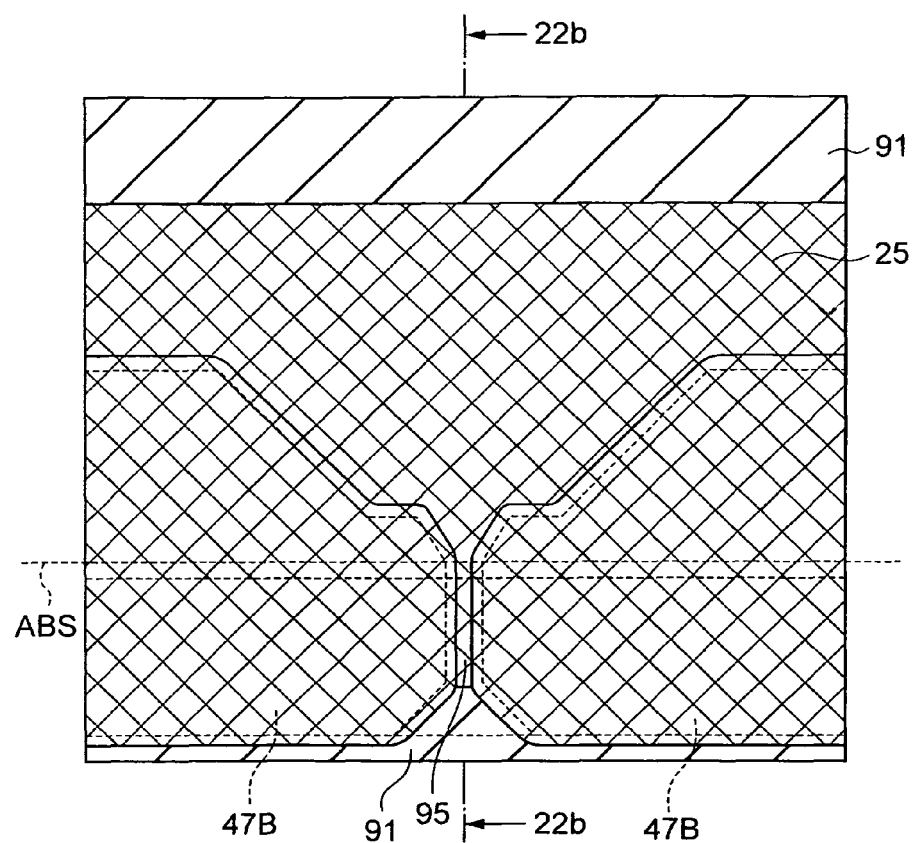
FIG. 19 is a plan view illustrating a principal part of a multilayer body in a step subsequent to that of FIG. 18.
Figure 20:
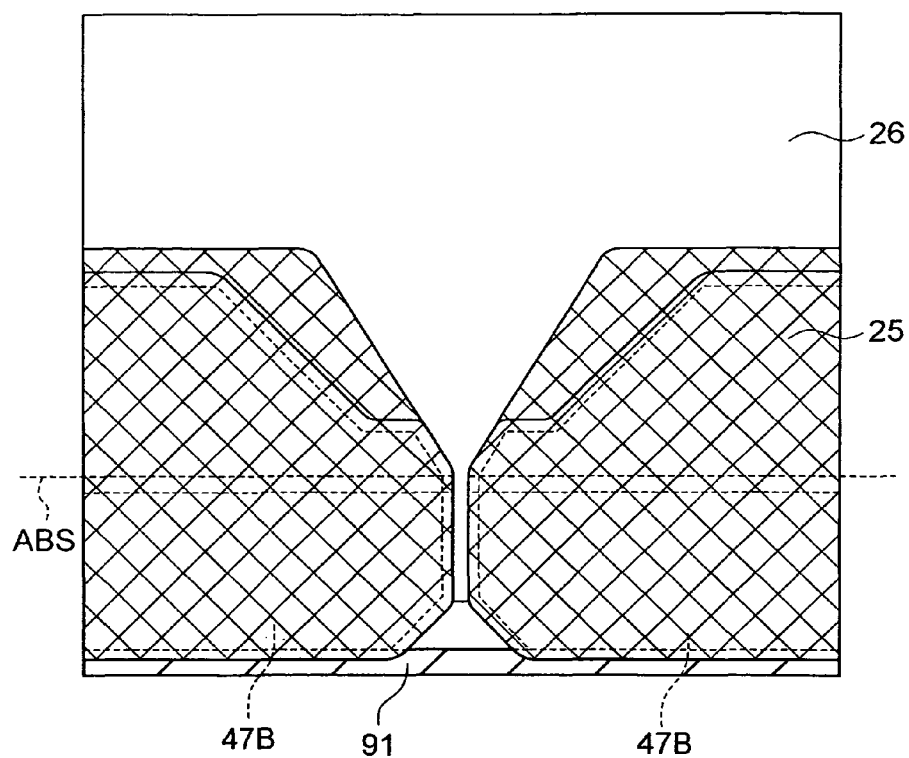
FIG. 20 is a plan view illustrating a principal part of a multilayer body in a step subsequent to that of FIG. 19.
Figure 24:
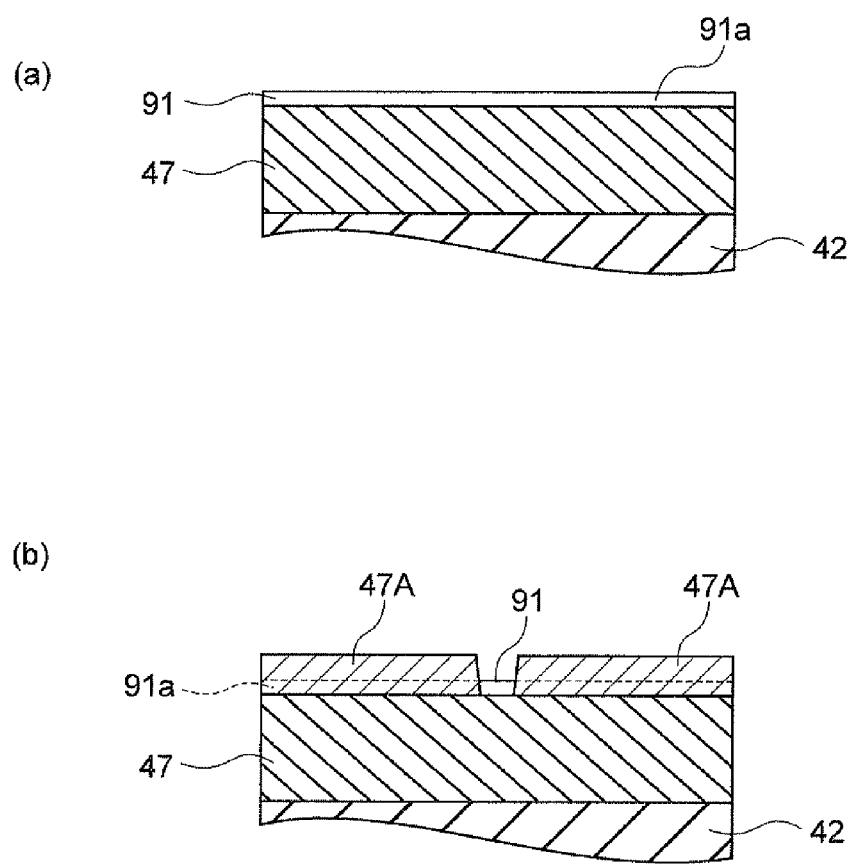
FIG. 24(a) is a sectional view illustrating a principal part of multilayer body when the multilayer body is cut along a planned line, in a step subsequent to that of FIG. 23(b)
FIG. 24(b) is a sectional view illustrating a principal part of multilayer body when the multilayer body is cut along a planned line, in a step subsequent to that of FIG. 24(a)

After that, as illustrated in FIG. 19, FIG. 25(a), a nonmagnetic thin-film 25 is formed so as to cover the base insulating layer 24 and the side shield part 47A, 47A. The nonmagnetic thin-film 25 is formed by sputtering with a nonmagnetic metal material such as Ru, NiCr, or NiCu, or an insulating material such as alumina. The nonmagnetic thin-film 25 is also formed at the very narrow area 95.

Here, as illustrated in FIG. 18, FIG. 22(a), side faces of the side shield part 47A, 47A appear in the very narrow area 95. On the side faces and also on the partial lower seed layer 91 in the very narrow area 95, the nonmagnetic thin-film 25 is formed. Therefore, illustrating the section of the multilayer body along the depth direction passing through the very narrow area 95, the front surface and the section of the nonmagnetic thin-film 25 appears in the section of the multilayer body as illustrated in FIG. 22(b).

Figure 28:
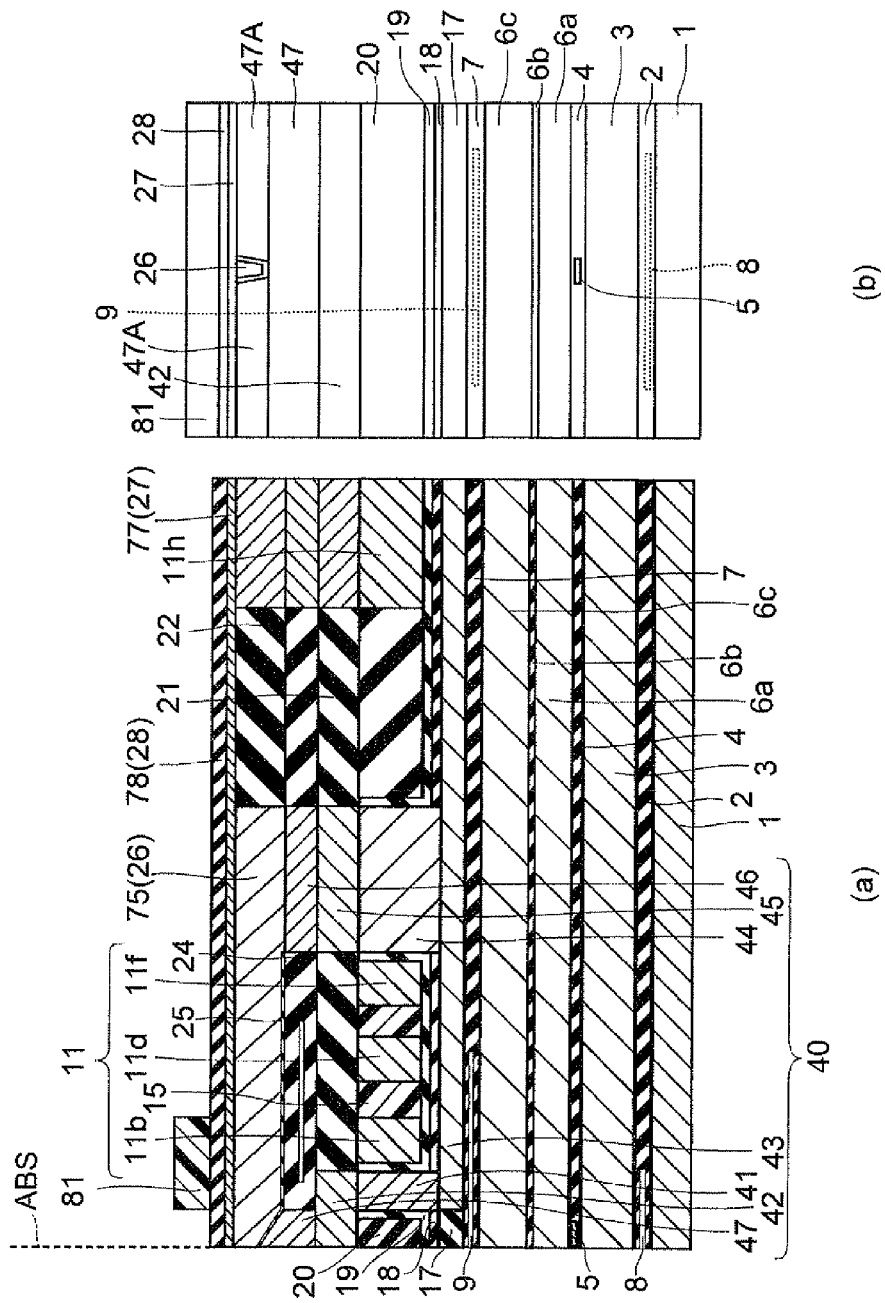
FIG. 28 illustrates a step subsequent to that of FIG. 26 in which (a) is a sectional view corresponding to FIG. 1, in which (b) is a front view corresponding to FIG. 2.

Subsequently, as illustrated in FIG. 28(a), FIG. 28(b), a magnetic layer 75 having a thickness of about 0.4 to 0.8 µm is formed by frame plating method with a magnetic material made of a ferromagnetic body such as CoNiFe, CoFe, NiFe. By this magnetic layer 75, the main magnetic pole layer 26 will be formed later.

After that, a nonmagnetic layer 77 (having a thickness of about 0.04 to 0.1 µm) is formed on the whole surface of the multilayer body by sputtering with a metal material such as Ru, NiCr, or NiCu. The nonmagnetic layer 77 will partly be etched away later, so as to become the above-mentioned nonmagnetic layer 27. Further, using an inorganic insulating material such as alumina (Al$_2$O$_3$) or silicon oxide, a nonmagnetic layer 78 (having a thickness of about 0.1 to 0.3 µm) is formed on the whole surface of the multilayer body. The nonmagnetic layer 78 will partly be etched away later, so as to become the above-mentioned nonmagnetic layer 28.

Subsequently, after applying a photoresist to the whole surface of the multilayer body, patterning with a predetermined photomask is performed, so as to form a resist pattern 81 near the ABS 30.

Next, using the resist pattern 81 as a mask, etching such as RIE, for example, is performed, so as to remove a part of the nonmagnetic layer 78. The etching in this case is performed such as to stop at the time when the bottom part of a groove formed by etching reaches the upper face of the nonmagnetic layer 77. To this aim, a material yielding an etching rate lower than that of the nonmagnetic layer 77 is used for the nonmagnetic layer 78.

After that, the resist pattern 81 is removed. Then, using the remaining nonmagnetic layer 78 as a mask, a part of the nonmagnetic layer 77 is etched away by IBE, for example. Further, using the remaining nonmagnetic layer 77 as a mask, a part of the nonmagnetic layer 75 is etched away by IBE, for example. This step forms the upper tilted surface 26c on the ABS side of the magnetic layer 75, and the main magnetic pole layer 26 is formed, as illustrated in FIG. 25(b).

Figure 27:
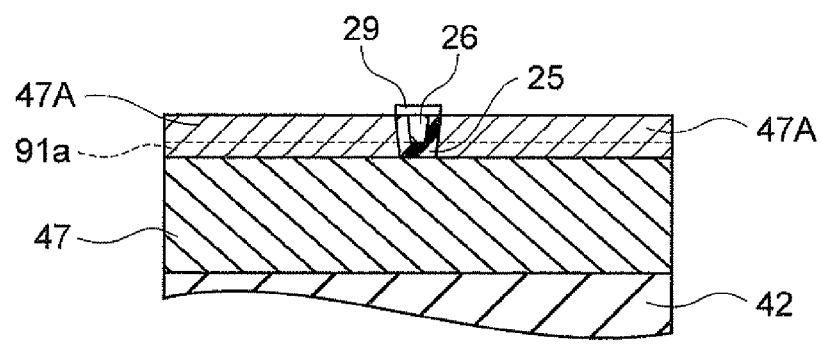
FIG. 27 is a sectional view illustrating a principal part of multilayer body when the multilayer body is cut along a planned line, in a step subsequent to that of FIG. 25(b)

Subsequently, as illustrated in FIG. 27, FIG. 32(a), 32(b), the gap layer 29 (having a thickness about 250 Å to 350 Å) is formed on the whole surface of the multilayer body by sputtering or CVD with an insulating material such as alumina (Al$_2$O$_3$) or a nonmagnetic conductive material such as Ru, NiCu, or Ta.

Further, an undepicted stopper film is formed by sputtering, for example, and a nonmagnetic film is formed thereon. Subsequently, an undepicted photoresist is applied to the whole surface of the multilayer body. Then, patterning with a predetermined photomask is performed, so as to form an undepicted resist pattern. Using this resist pattern as a mask, the nonmagnetic film is etched by RIE, for example. This etching is performed such as to stop when the bottom part of a groove formed by etching reaches the upper face of the stopper film. Then, after removing the resist pattern that is not depicted, the remaining nonmagnetic film is used as a mask for partly etching the gap layer 29, nonmagnetic layer 77 and nonmagnetic layer 78 away by RIE or the like. Here, the gap layer 29, nonmagnetic layer 77 and nonmagnetic layer 78 are partly removed, so as to secure a space for forming the above-mentioned upper yoke layer 65.

Subsequently, the write shield layer 60 is formed by performing an upper shield layer forming step. In this embodiment, the upper shield layer forming step has a later-described first upper shield part forming step, a second upper shield part forming step, a linking shield part forming step and a trimming step.

Figure 29:
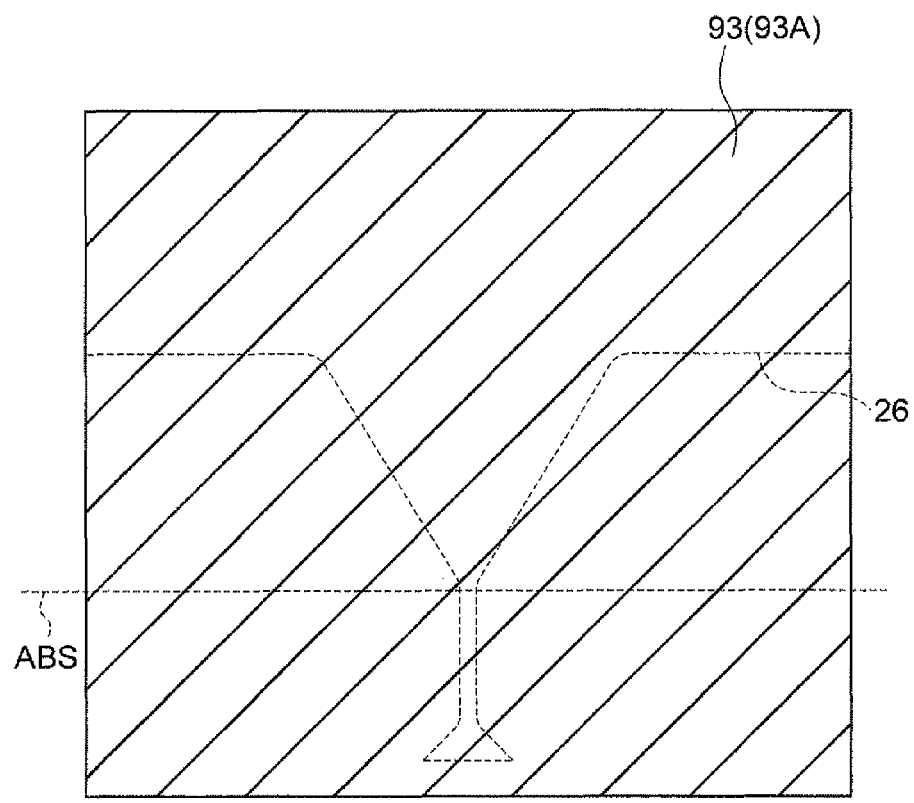
FIG. 29 is a plan view illustrating a principal part of a multilayer body in a step of manufacturing the thin-film magnetic head 300 according to a first embodiment of the present invention.

First, the opposing shield part 61 is formed by performing the first upper shield part forming step. In this step, first, as illustrated in FIG. 29, FIG. 30, a wide upper seed layer 93 is formed on the main magnetic pole layer 26 in the surface of the multilayer body. Subsequently, an electro plating, using this wide upper seed layer 93 as a ground, is performed, a magnetic layer is formed on the surface of the multilayer body. This magnetic layer is formed using a magnetic material made of a ferromagnetic body such as CoNiFe, CoFe, CoFeN, NiFe or the like by a thickness of about 0.5 to 1.2 µm. This magnetic layer will later form the opposing shield part 61 and the upper yoke layer 65.

Subsequently, an insulating layer (having a thickness of about 1 to 3 µm) is formed on the whole surface of the multilayer body using an insulating material such as alumina (Al$_2$O$_3$). Further, the whole surface of the multilayer body is polished by CMP until a surface of the magnetic layer emerges, so as to be made flat. This forms the opposing shield part 61, the upper yoke layer 65 and an insulating layer 31, as illustrated in FIG. 31, FIG. 32(a), FIG. 32(b). At this time, the surface of the multilayer body is polished such that the opposing shield part 61 has a thickness of about 0.5 to 1.0 µm.

Next, a second upper shield part forming step is performed. In this step, as illustrated in FIG. 33(a), FIG. 33(b), at parts of the surface of the multilayer body where the upper front shield part 62 and the rear shield part 64 will be formed, the pre-trim front shield part 62A and the rear shield part 64 are formed respectively. In this event, the pre-trim front shield part 62A is disposed in the ABS 30 and therefore corresponds to the second upper shield part according to the embodiment of the present invention. In the second shield part forming step, the pre-trim front shield part 62A and the rear shield part 64 are formed by, for example, frame plating method using a magnetic material made of a ferromagnetic body such as NiFe or CoNiFe. In this event, the space between the pre-trim front shield part 62A and the rear shield part 64 is made to range from about 3.0 µm to about 3.5 µm.

In addition, the pre-trim front shield part 62A is formed to be connected to the opposing shield part 61 and disposed in the ABS 30. The pre-trim front shield part 62A has a shape illustrated on the upper side in FIG. 7. In the pre-trim front shield part 62A, the whole front end face 62a is disposed in the ABS 30.

Then, first, as illustrated in FIG. 34(a), FIG. 34(b), a conductor layer 71 is formed on the surface of multilayer body between the first shield part (pre-trim front shield part 62A) and the rear shield part 64. This conductor layer 71 will later form the upper thin-film coil 51. The conductor layer 71 is formed such as to have two interstices 71a and come into contact with the first shield part (pre-trim front shield part 62A) and the rear shield part 64 through an interlayer insulating layer 32 without gaps. The conductor layer 71 is an intermittent conductor layer, since it is provided with interstices 71a.

After that, a photoresist layer 55 (having a thickness of about 2 µm to 3 µm) is formed so as to cover the two interstices 71a in the conductor layer 71, a cover insulating film adapted to cover the surface of the multilayer body is formed using alumina ($Al_2O_3$) by a thickness of about 3 µm to 4 µm. Subsequently, the surface of the multilayer body is polished by CMP until the pre-trim front shield part 62A and the rear shield part 64 emerge, so as to become flat.

This forms the upper thin-film coil 51 and the photoresist layer 55, as illustrated in FIG. 35(a), FIG. 35(b). In this event, flattening of the surface of the multilayer body is performed so that the thickness of the upper thin-film coil 51 is about 1.0 µm to 1.8 µm. Besides, the above-described common flat surface 59 is formed by the flattening of the surface of the multilayer body.

Subsequently, as illustrated in FIG. 36(a), FIG. 36(b), an insulating layer 34 is formed on the whole surface of the multilayer body using an insulating material such as alumina ($Al_2O_3$), and the insulating layer 34 is partially perforate. After that, the linking shield part forming step is performed. In this step, the linking shield part 63 is formed by frame plating method using a magnetic material made of a ferromagnetic body such as NiFe, CoNiFe or the like. The linking shield part 63 is formed so as to connect to the pre-trim shield part 62A. The linking shield part 63 is formed so as to straddle the turn parts 51g, 51e, 51c of the upper thin-film coil 51 through the insulating layer 34.

Further, the linking shield part 63 is receded from the front end face 30h (also receded from the ABS 30) and formed at a position distanced from the ABS 30. In other words, the linking shield part 63 is formed at a position where a receding space 63h is ensured between the linking shield part 63 and the ABS 30. The receding space 63h becomes an elongated part having a width, for example, about 0.4 µm to 0.7 µm along the ABS 30 and the same height as that of the linking shield part 63.

Next, a trimming step is performed. In this step, as illustrated in FIG. 37(a), FIG. 37(b), IBE is performed by applying ion beams IB from the upper direction using the linking shield part 63 as a mask to cut off the part of the pre-trim front shield part 62A which is not covered with the linking shield part 63. Since the part of the pre-trim front shield part 62A on the ABS side is not covered with the linking shield part 63, the part on the ABS side of the pre-trim front shield part 62A is cut off by performing IBE. In this event, IBE is performed in a manner to leave a part of the pre-trim front end face 62a of the pre-trim front shield part 62A disposed in the ABS 30. Thus, as shown in FIG. 7, the above-described shield front end face 62b is formed of the part of the pre-trim front end face 62a which has not been cut off but left. Further, IBE is performed in a manner to cause the shield connecting part 62c having the above-described receding tilt structure to appear.

Though the linking shield part 63 itself is used as a mask in the above-described trimming step, a mask such as a photoresist or the like covering the upper face of the linking shield part 63 may be used instead of using the linking shield part 63. More specifically, a mask equal in size to the linking shield part 63 may be formed on the upper face of the linking shield part 63 using photoresist or the like, and the part of the pre-trim front shield part 62A which is not covered with the linking shield part 63 may be cut off using the mask.

Further, with chemical action of gas plasma used in etching, the etching can proceed not only in the vertical direction (the longitudinal direction in FIG. 37) but also in the horizontal direction (the lateral direction in FIG. 37) of the pre-trim front shield part 62A. Therefore, it is preferable to perform non-active IBE, namely, ion milling in the trimming step. Etching performed utilizing physical impact when inactive ions are applied is also called ion milling for distinction from reactive ion etching.

Subsequently, as illustrated in FIG. 1, the displacement suppression layer 85 is formed. After that, the protective insulating layer 90 is formed by an insulating material such as alumina ($Al_2O_3$) so as to cover the displacement suppression layer 85. After that, the ABS 30 is formed by performing polishing processing or mechanical processing to the front end face 30h, whereby the thin-film magnetic head 300 is completed.

The protective insulating layer 90 is formed such as to come into contact with an entire the shield connecting part 62c and be embedded without gap between the shield connecting part 62c and the ABS 30.

(Operation and Effect of Thin-Film Magnetic Head 300)

As in the foregoing, the thin-film magnetic head 300 has the multiple shield layer in which the leading shield part 47 overlie the side shield parts 47A, 47A. The side shield parts 47A, 47A are formed on the leading shield part 47 via the partial lower seed layer 91. The partial lower seed layer 91 has the partial arrangement structure in which it is arranged only on the lower formation zone 92B and receds from the ABS 30. Therefore, the partial lower seed layer 91 does not appear in a joint part of the leading shield part 47 and the side shield parts 47A, 47A in the ABS 30.

In the thin-film magnetic head 300, the lower absence zone 92A2 is further formed between the leading shield part 47 and the side shield parts 47A, 47A, and the end face 91a of the partial lower seed layer 91 appears in the lower absence zone 92A2 without appearing in the ABS 30 (see FIG. 31).

The leading shield part 47 and the side shield parts 47A, 47A are formed mainly by electro plating and are therefore in common in the direction of crystal of the magnetic material. However, the partial lower seed layer 91 is formed by spluttering or the like and is therefore different in the direction of crystal of the magnetic material and in magnetic characteristics from the leading shield part 47 and the side shield parts 47A, 47A.

However, since the partial lower seed layer 91 has the partial arrangement structure in the thin-film magnetic head 300, a seed layer different in magnetic characteristics from the leading shield part 47 and the side shield parts 47A, 47A does not exists between the leading shield part 47 and the side shield parts 47A, 47A in the ABS 30. This rarely causes a phenomenon that a component of the magnetic flux emitted from the magnetic pole end face 26a spreading in the track width direction remains without being absorbed by the leading shield part 47 or the side shield parts 47A, 47A (this phenomenon is referred also to as residual of magnetic flux in this embodiment).

Accordingly, there rarely occurs a phenomenon that data recorded on a recording medium is erased or rewritten by the magnetic flux remaining without being absorbed by the leading shield part 47 or the side shield parts 47A, 47A.

As described above, the thin-film magnetic head 300 has the multiple shield layer which is arranged in the ABS 30 but in which ATE and WATE caused by the multiple shield layer can be improved.

On the other hand, the effect of preventing the residual of magnetic flux can be achieved only by partially retracting the seed layer from the ABS 30. However, in order to more surely prevent the residual of magnetic flux, it is preferable to set the lower absence zone 92A2 in the band-shaped area over the entire width direction of the ABS 30 as in the thin-film magnetic head 300. This makes all the part of the end face 91a of the partial lower seed layer 91 appear in the lower absence zone 92A2 but not appear in the ABS 30. This achieves a structure in which the seed layer different in magnetic characteristics from the leading shield part 47 and the side shield parts 47A, 47A does not exist at all between them. This structure can surely prevent the residual of magnetic flux and thus can more surely improve ATE and WATE.

Meanwhile, the thin-film magnetic head 300 is structured such that only the upper front shield part 62 is formed as the magnetic layer which is to be disposed between the opposing shield part 61 and the linking shield part 63. Therefore, as compared to the case where the two magnetic layers are formed between the opposing shield part 61 and the linking shield part 63, the length of the magnetic path along the top-down direction is shorter so that the magnetic path length is able to be reduced in the thin-film magnetic head 300.

Hence, the thin-film magnetic head 300 is able to improve the flux rise time, non-linear transition shift (NLTS) characteristic, overwrite characteristic, and the like of the recording head, and follow rapid changes in recording signals having a high frequency and changing fast. This makes the thin-film magnetic head 300 suitable as a recording head for hard disk drives mounted to servers in particular.

In addition, the upper front shield part 62 has a lateral width capable of reaching, from the ABS 30, the upper thin-film coil 51 via the interlayer insulating layer 32. Therefore, even though the write shield layer 60 has a different-distance structure, the front shield part 62 is surely connected to both of the opposing shield part 61 and the linking shield part 63. Accordingly, the opposing shield part 61 opposing the main magnetic pole layer 26 and the linking shield part 63 straddling the turn parts 51g, 51e, 51c of the upper thin-film coil 51 are liked together as a continuous line and are able to form the magnetic circuit as a continuous line. Note that the different-distance structure means a structure that the respective distances of the opposing shield part 61 and the linking shield part 63 from the ABS 30 are different because the opposing shield part 61 is disposed in the ABS 30 and the linking shield part 63 is receded from the ABS 30.

A structure is discussed here which is intended to surely connect both of the opposing shield part 61 and the linking shield part 63 by the upper front shield part 62 in the different-distance structure of the write shield layer 60. Since the sizes of the upper end face and the lower end face are maximum when the whole front end face is disposed in the ABS 30 as in the pre-trim front shield part 62A, it is preferable that the whole front end face is disposed in the ABS 30 like the pre-trim front shield part 62A in order to realize the aforementioned structure.

However, this causes the pre-trim front end face 62a to be largely exposed in the ABS 30. The upper front shield part 62 and the pre-trim front shield part 62A are formed of a magnetic material made of a ferromagnetic body such as CoNiFe, CoFe, CoFeN, NiFe or the like. Therefore, if the whole pre-trim front end face 62a is exposed in the ABS 30 like the pre-trim front shield part 62A, the pre-trim front shield part 62A will be affected more strongly when the photoresist layer 55 expands due to the heat generation of the upper thin-film coil 51.

Since the frying height is very small, collision between the thin-film magnetic head 300 and the recording medium can occur even when only a limited and small part of the pre-trim front end face 62a projects. That the whole pre-trim front end face 62a is exposed in the ABS 30 means that many such small parts which will project exist in the ABS 30, which means that there are accordingly many projecting forms which can collide with the recording medium and collision between the thin-film magnetic head 300 and the recording medium is more likely to occur.

Hence, in the thin-film magnetic head 300, the upper front shield part 62 having the structure illustrated on the lower side in FIG. 7 is formed. Thus, the part exposed in the ABS 30 is the shield front end face 62b.

Further, in the upper front shield part 62, the shield upper end face 62f is disposed at a position distanced more from the substrate 1 than is the shield front end face 62b, and the upper front shield part 62 has the shield connecting part 62c connecting the shield front end face 62b to the shield upper end face 62f. In such a structure, the front end face disposed in the ABS 30 is smaller in size than that when the shield upper end face 62f reaches the ABS 30, namely, the pre-trim front shield part 62A as illustrated on the upper side in FIG. 7. Therefore, provision of the upper front shield part 62 makes it possible to suppress the situation that the thin-film magnetic head 300 collides with the recording medium.

Hence, the thin-film magnetic head 300 is able to restrain the write shield layer 60 from projecting as the upper thin-film coil 51 generate heat especially. Consequently, the thin-film magnetic head 300 is very unlikely to be damaged by the protrusion of the recording head and thus can approach recording media.

While the thin-film magnetic head 300 is incorporated in an undepicted slider, the flying height of the slider from the recording medium surface can be reduced. Therefore, the thin-film magnetic head 300 can enhance the resolution of recording and reproducing heads, thereby improving their signal-to-noise ratio. This can also increase the recording density of the thin-film magnetic head 300.

On the other hand, the upper front shield part 62 is formed, after the formation of the linking shield part 63, by cutting off a part thereof on the ABS 30 side where the linking shield part 63 is not in contact therewith. For this reason, though the part exposed in the ABS 30 is small, the shield upper end face 62f is surely ensured, resulting in a structure in which the upper front shield part 62 and the linking shield part 63 can be surely connected.

Further, when cutting off the part of the upper front shield part 62 on the ABS 30 side, the shield front end face 62b is ensured so that a part of the pre-trim front end face 62a is left as the shield front end face 62b without cutting off the whole pre-trim front end face 62a. If IBE proceeds to the degree that the shield front end face 62b is not ensured when cutting off the part of the pre-trim front shield part 62A on the ABS 30 side, the shield lower end face 62r can also be cut off. In this case, the part which is to be connected to the opposing shield part 61 becomes smaller, so that the connection between the opposing shield part 61 and the upper front shield part 62 can be insufficient. However, there is no such possibility in the thin-film magnetic head 300.

Further, the upper front shield part 62 has the shield connecting part 62c, and the shield connecting part 62c has the tilt structure. Therefore, the upper front shield part 62 has a structure which can be surely formed by the above-described IBE from the upper direction. Without the tilt structure, for example, when a surface part extending from the shield front end face 62b to the shield upper end face 62f is bent in an S-shape, it is difficult to form the upper front shield part 62 by IBE. However, in the thin-film magnetic head 300, there is no such possibility and the upper front shield part 62 is able to be surely formed by IBE from the upper direction.

Further, since the shield connecting part 62c has the receding tilt structure, the volume of the upper front shield part 62 is reduced as compared to the case without the receding tilt structure. This further suppresses the possibility of projection of the upper front shield part 62.

Further, the shield connecting part 62c has the lateral flat part 62c1. The lateral flat part 62c 1 is generally formed along the direction intersecting the ABS 30. Accordingly, the shield connecting part 62c is able to surely receive the pressure received in the longitudinal direction from the embedded part 90a of the protective insulating layer 90 as compared to the case without the lateral flat part 62c1. Accordingly, in the thin-film magnetic head 300, the embedding state of the protective insulating layer 90 is stable.

Additionally, the shield connecting part 62c has the longitudinal flat part 62c2. The longitudinal flat part 62c2 is generally formed along the ABS 30. Accordingly, the upper front shield part 62 has a structure which can be surely formed by IBE from the upper direction or the like to the pre-trim front shield part 62A.

As has been described, in the thin-film magnetic head 300, the magnetic path length can be reduced and projection of a part of the ABS 30 can be suppressed, so that both of the suppression of projection of a part of the medium-opposing surface and the reduction in magnetic path length can be realized. Accordingly, the thin-film magnetic head 300 is configured such that the projection of a part of the ABS 30 can be suppressed without affecting the reduction in magnetic path length.

Since the lower thin-film coil 11 and upper thin-film coil 51 have the variable width structures as mentioned above, current flows are less likely to be obstructed, whereby the resistance value is able to be restrained from rising. Accordingly, generation of heat from the lower thin-film coil 11 and the upper thin-film coil 51 are able to be suppressed effectively in the thin-film magnetic head 300.

MODIFIED EXAMPLE 1

The above-described thin-film magnetic head 300 may have the upper front shield part 62B as illustrated in FIG. 8(*a*) in place of the above-described upper front shield part 62. The upper front shield part 62B is different in that it has a shield connecting part 62d in place of the shield connecting part 62c, as compared with the upper front shield part 62. The shield connecting part 62d is different in that it is not have the lateral flat part 62c1, as compared with the shield connecting part 62c.

The thin-film magnetic head 300 may have the upper front shield part 62D as illustrated in FIG. 8(*b*) in place of the upper front shield part 62. The upper front shield part 62D is different in that it has a shield connecting part 62e in place of the shield connecting part 62c, as compared with the upper front shield part 62. The shield connecting part 62e is different in that it is not have the longitudinal flat part 62c2, as compared with the shield connecting part 62c.

In both of the case where the upper front shield part 62B is provided and the case where the upper front shield part 62D is provided, the shield front end face 62b is disposed in the ABS 30 and the size of the part thereof exposed in the ABS 30 is reduced as compared to that of the pre-trim front shield part 62A. Therefore, the possibility of projection of the upper front shield parts 62B, 62D is surely suppressed as compared to the pre-trim front shield part 62A. Accordingly, both of the suppression of projection of a part of the medium-opposing surface and the reduction in magnetic path length can be realized in both of the case where the upper front shield part 62B is provided and the case where the upper front shield part 62D is provided.

MODIFIED EXAMPLE 2

In the above-described embodiment, the partial lower seed layer 91 is formed by performing the wide lower seed layer forming step and the lower seed layer removing step. More specifically, the partial lower seed layer 91 is formed by forming the wide lower seed layer 91A on the surface of the multilayer body and then removing an unrequired part of the wide lower seed layer 91A.

However, the partial lower seed layer 91 can be formed also as in the following manner. Specifically, a mask is formed in advance on the lower exception zone 92A1 using a photoresist or the like, sputtering is performed, and then the mask is removed. Thus, the seed layer is formed only in a required area, so that the formed seed layer can be used as the partial lower seed layer 91. This eliminates the needs to remove the unrequired part of the seed layer, thereby preventing waste of the material of the seed layer.

Second Embodiment

The above-described thin-film magnetic head 300 has the write shield layer 60, and the write shield layer 60 has the opposing shield part 61. The opposing shield part 61 is formed on the wide upper seed layer 93 on the main magnetic pole layer 26. However, the wide upper seed layer 93 does not have the partial arrangement structure as that of the partial lower seed layer 91. The wide upper seed layer 93 therefore appears in the ABS 30 as illustrated in FIG. 30, FIG. 31.

In the case of such a thin-film magnetic head 300, even if the residual of magnetic flux on the side closer to the substrate 1 than is the main magnetic pole layer 26 (referred also to as lower residual) can be prevented, the residual of magnetic flux on the side more distanced from the substrate 1 than is the main magnetic pole layer 26 (referred also to as upper residual) could not be prevented.

Figure 38:
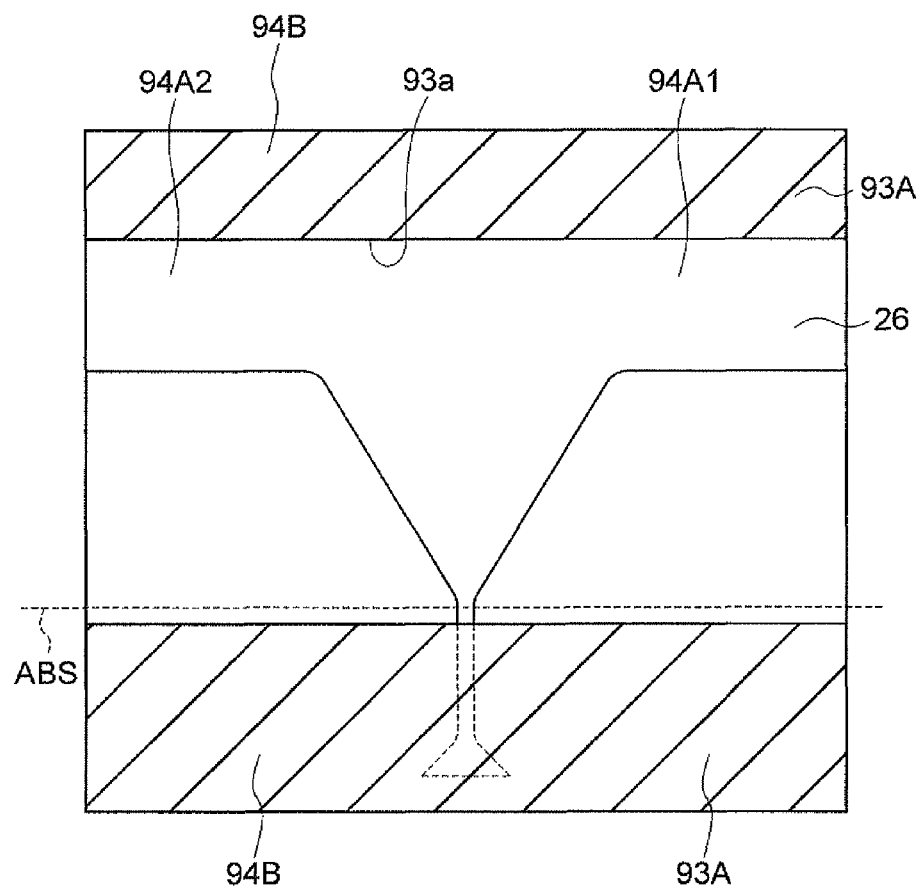
FIG. 38 is a plan view illustrating a principal part of a multilayer body in a step of manufacturing the thin-film magnetic head 300 according to a second embodiment.
Figure 39:
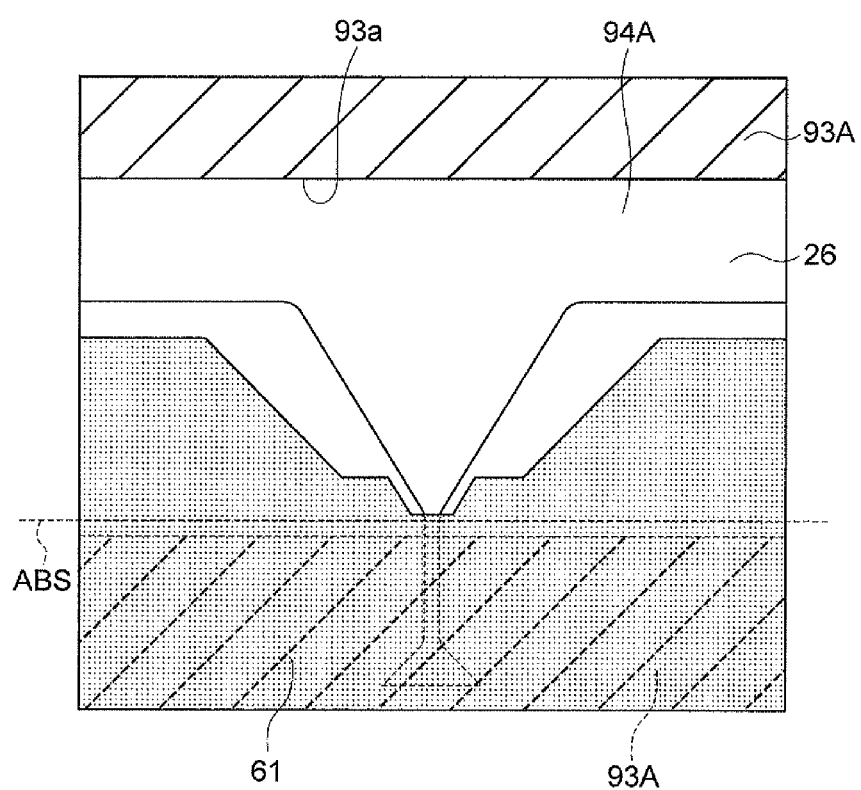
FIG. 39 is a plan view illustrating a principal part of a multilayer body in a step subsequent to that of FIG. 38.

Hence, in order to prevent the upper residual, it is preferable to form a seed layer having the partial arrangement structure also on the side more distanced from the substrate 1 than is the main magnetic pole layer 26. For example, it is preferable to form a partial upper seed layer 93A illustrated in FIG. 38 in place of the above-described wide upper seed layer 93.

The partial upper seed layer 93A is formed in a partial area of the upper thin-film-like space having a very small thickness between the main magnetic pole layer 26 and the opposing shield part 61. Further, the whole partial upper seed layer 93A is arranged at a position distanced from the ABS 30.

The partial upper seed layer 93A has the partial arrangement structure in which it is arranged only on a later-described upper formation zone 94B. The upper formation zone 94B corresponds to an area of the surface of the multilayer body except an upper exception zone 94A1 at the stage before the formation of the ABS 30. At the stage after the formation of the ABS 30, the upper formation zone 94B corresponds to an area of the surface of the multilayer body except an upper absence zone 94A2 and recedes from the ABS 30. In this embodiment, the upper absence zone 94A2 is set in an area having the same shape and the same size as those of the lower absence zone 92A2.

In the thin-film magnetic head 300, all the seed layer is removed from the surface in the upper absence zone 94A2.

Figure 40:
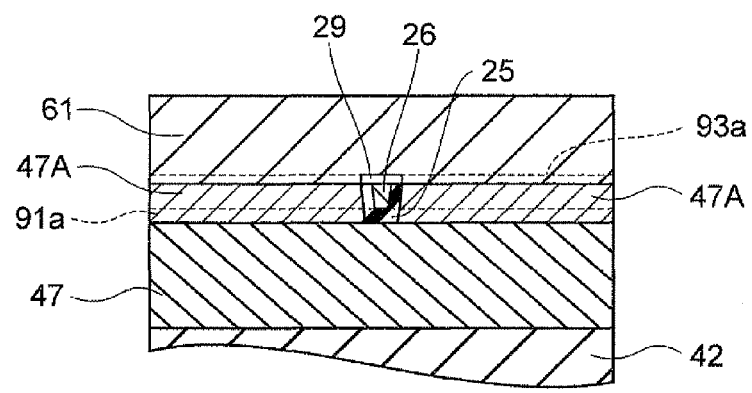
FIG. 40 is a sectional view illustrating a principal part of multilayer body when the multilayer body is cut along a planned line, in the step of manufacturing the thin-film magnetic head 300 according to a second embodiment.
Figure 41:
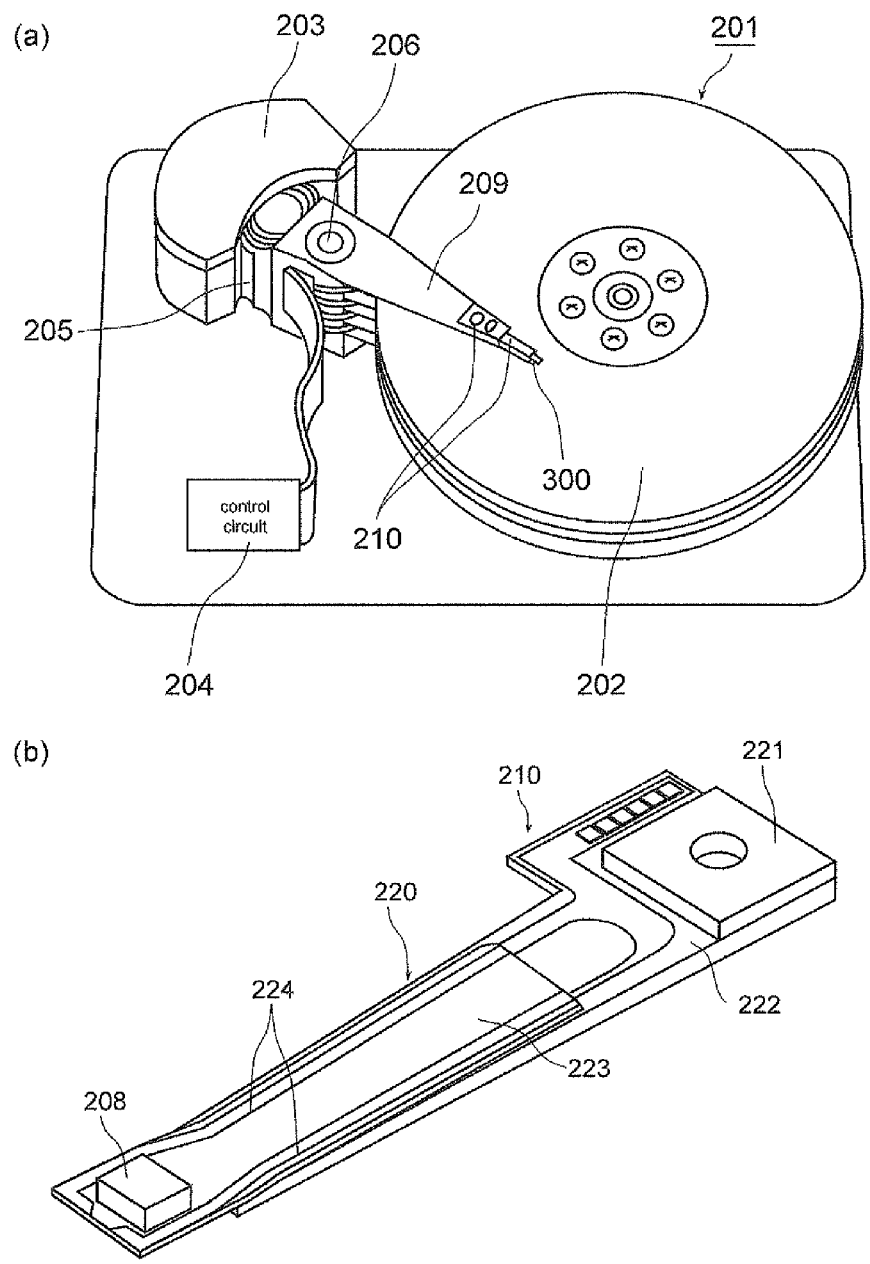
FIG. 41(a) is a perspective view illustrating a hard disk drive equipped with a thin-film magnetic head according to an embodiment of the present invention.
FIG. 41(b) is a perspective view illustrating a rear side of HGA.

The upper absence zone 94A2 is arranged in the above-described upper thin-film-like space, and an end face 93a of the partial upper seed layer 93A appears in the upper absence zone 94A2. The end face 93a does not appear in the ABS 30 (see FIG. 40).

In the case where the thin-film magnetic head 300 has the partial upper seed layer 93A, a later-described upper seed layer forming step is performed in the above-described upper shield layer forming step. Further, in the first upper shield part forming step, the opposing shield part 61 is formed on the partial upper seed layer 93A. Further, in the upper seed layer forming step, a wide upper seed layer forming step and an upper seed layer removing step are performed.

Further, by performing the wide upper seed layer forming step as in the first embodiment, the wide upper seed layer 93 similar to that in the first embodiment is formed. Then, by performing the upper seed layer removing step, an excepted upper seed layer (not illustrated) of the wide upper seed layer 93 is removed. The excepted upper seed layer corresponds to a part of the wide upper seed layer 93 formed on the upper exception zone 94A1. The upper exception zone 94A1 is set in an area having the same shape and the same size as those of the above-described lower exception zone 92A 1.

In the above-described manner, the partial upper seed layer 93A can be obtained. Thereafter, through the same steps as those in the foregoing, the thin-film magnetic head 300 is manufactured.

In the case of this thin-film magnetic head 300, the partial upper seed layer 93A has the partial arrangement structure as that of the partial lower seed layer 91 and therefore the partial upper seed layer 93A does not appear in the ABS 30. Accordingly, the thin-film magnetic head 300 can surely prevent the upper residual as well as the lower residual. Therefore, the thin-film magnetic head 300 can more surely improve ATE and WATE caused by the multiple shield layer.

This thin-film magnetic head 300 has a structure in which the partial upper seed layer 93A does not exist on the main magnetic pole layer 26. In such a structure, it is preferable to form the gap layer 29 using a nonmagnetic conductive material such as Ru, NiCu, Ta into a metal gap layer so as to promote the growth of the plating film in order that the opposing shield part 61 is formed on the main magnetic pole layer 26.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A method of manufacturing a thin-film magnetic head constructed such that a main magnetic pole layer having a magnetic pole end face on a side of a medium- opposing surface opposing a recording medium, a lower shield layer and an upper shield layer having respective shield end faces arranged in the medium-opposing surface and arranged to hold the main magnetic pole layer therebetween, and a thin-film coil wound around any one of the main magnetic pole layer, the lower shield layer, and the upper shield layer are laminated on a substrate, the method comprising:

a lower shield layer forming step of forming the lower shield layer,
wherein the lower shield layer forming step comprises:

a first lower shield part forming step of forming a first lower shield part constituting the lower shield layer in a lower shield planned area on the substrate, including a planned line along the medium-opposing surface which the medium-opposing surface is formed later;

a lower seed layer forming step of forming a partial lower seed layer having a partial arrangement structure in which the partial lower seed layer is arranged on a lower formation zone except a lower exception zone including the planned line when forming a lower seed layer for forming a second lower shield part constituting the lower shield layer on the first lower shield part; and a second lower shield part forming step of forming the second lower shield part on the partial lower seed layer.

2. The method of manufacturing a thin-film magnetic head according to claim 1, further comprising:

an upper shield layer forming step of forming the upper shield layer, wherein the upper shield layer forming step comprises:

an upper seed layer forming step of forming a partial upper seed layer having a partial arrangement structure in which the partial upper seed layer is arranged on an upper formation zone except an upper exception zone including the planned line when forming an upper seed layer for forming a first upper shield part constituting the upper shield layer on the main magnetic pole layer; and a first upper shield part forming step of forming the first upper shield part, and wherein in the first upper shield part forming step, the first upper shield part is formed on the partial upper seed layer.

3. The method of manufacturing a thin-film magnetic head according to claim 2, wherein the upper seed layer forming step comprises:

a wide upper seed layer forming step of forming a wide upper seed layer arranged on the upper exception zone and the upper formation zone on an upper face of a multilayer body including the substrate when forming the partial upper seed layer; and an upper seed layer removing step of removing an excepted upper seed layer, of the wide upper seed layer, formed on the upper exception zone.

4. The method of manufacturing a thin-film magnetic head according to claim 2, wherein in the upper seed layer forming step, the upper exception zone is set in a band-shaped area along the medium-opposing surface including the planned line in its entirety.

5. The method of manufacturing a thin-film magnetic head according to claim 4, wherein when a direction separating from the medium-opposing surface toward a position where the thin-film coil is formed on the substrate is a depth direction, the upper exception zone is secured along the depth direction from outside the planned line, in the upper seed layer forming step.

6. The method of manufacturing a thin-film magnetic head according to claim 1, wherein the lower seed layer forming step comprises:

a wide lower seed layer forming step of forming a wide lower seed layer arranged on the lower exception zone and the lower formation zone on an upper face of a multilayer body including the substrate when forming the partial lower seed layer; and a lower seed layer removing step of removing an excepted lower seed layer formed on the lower exception zone of the wide lower seed layer.

7. The method of manufacturing a thin-film magnetic head according to claim 1, wherein in the lower seed layer forming step, the lower exception zone is set in a band-shaped area along the medium-opposing surface including the planned line in its entirety.

8. The method of manufacturing a thin-film magnetic head according to claim 7, wherein when a direction separating from the medium-opposing surface toward a position where the thin-film coil is formed on the substrate is a depth direction, the lower exception zone is secured along the depth direction from outside the planned line, in the lower seed layer forming step.

9. The method of manufacturing a thin-film magnetic head according to claim 1, further comprising:
 an upper shield layer forming step of forming the upper shield layer, wherein the upper shield layer forming step comprises:
 a first upper shield part forming step of forming a first upper shield part constituting the upper shield layer;
 a second upper shield part forming step of forming a second upper shield part constituting the upper shield layer on the medium-opposing surface side of a conductor layer constituting the thin-film coil such that the second upper shield part is connected to the first upper shield part and the second upper shield part is arranged as part of the medium-opposing surface;
 a linking shield part forming step of forming a linking shield part constituting the upper shield layer such that the linking shield part is connected to the second upper shield part, straddles the thin-film coil, and recesses from the medium-opposing surface to be distanced from the medium-opposing surface; and
 a trimming step of cutting off a part of the second upper shield part on the medium-opposing surface side that is not covered with the linking shield part.

10. The method of manufacturing a thin-film magnetic head according to claim 9, wherein in the trimming step, the part of the second upper shield part, on the medium-opposing surface side, which is not covered with the linking shield part is cut off using the linking shield part formed by the linking shield part forming step as a mask.

* * * * *